United States Patent
Kelley et al.

(10) Patent No.: US 9,976,852 B2
(45) Date of Patent: May 22, 2018

(54) INSPECTION PROGRAM EDITING ENVIRONMENT PROVIDING USER DEFINED COLLISION AVOIDANCE VOLUMES WITH INTEGRAL MODIFICATION PROPERTIES

(71) Applicants: Mitutoyo Corporation, Kanagawa-ken (JP); Mitutoyo Europe GmbH, Neuss (DE)

(72) Inventors: Brenan N. Kelley, Bellevue, WA (US); Kareem G. Fawell, Woodinville, WA (US); Matthew Buza, Arlington, WA (US); Dahai Yu, Redmond, WA (US)

(73) Assignees: Mitutoyo Corporation, Kanagawa-ken (JP); Mitutoyo Europe Gmbh, Neuss (DE)

( * ) Notice: Subject to any disclaimer, the term of this patent is extended or adjusted under 35 U.S.C. 154(b) by 108 days.

(21) Appl. No.: 15/249,915

(22) Filed: Aug. 29, 2016

(65) Prior Publication Data
US 2016/0370165 A1 Dec. 22, 2016

Related U.S. Application Data

(63) Continuation-in-part of application No. PCT/US2016/030591, filed on May 3, 2016.
(Continued)

(51) Int. Cl.
*G01B 5/008* (2006.01)
*G01B 21/04* (2006.01)
(Continued)

(52) U.S. Cl.
CPC .......... *G01B 21/047* (2013.01); *G01B 7/008* (2013.01); *G01B 21/04* (2013.01);
(Continued)

(58) Field of Classification Search
CPC ..................................................... G01B 5/008
(Continued)

(56) References Cited

U.S. PATENT DOCUMENTS 4,901,253 A 2/1990 Iwano et al.
4,908,951 A 3/1990 Gurny
(Continued)

FOREIGN PATENT DOCUMENTS

EP 1 330 686 B1 7/2003
EP 2 624 088 A2 8/2013

OTHER PUBLICATIONS

U.S. Appl. No. 14/682,976, entitled "Inspection Program Editing Environment Including Real-Time Feedback Related to Throughout," filed Apr. 9, 2015, 61 pages.

*Primary Examiner* — G. Bradley Bennett
(74) *Attorney, Agent, or Firm* — Seed Intellectual Property Law Group LLP

(57) ABSTRACT

A system includes an environment for programming workpiece inspection operations for a coordinate measurement machine (CMM). The environment includes a user interface comprising a program simulation portion configured to display a 3D view of the workpiece and/or representations of inspection operations to be performed on the workpiece. The user interface further includes auxiliary collision avoidance volume (CAV) creation elements that create CAV's that are represented in the 3D view. The 3D CAVs and/or their representations have integrated graphical modification properties which are controllable in the user interface. The modification properties are activated by selection of a face of the CAV representation, without the explicit activation of a separate modification control element mode or tool. This results in a simplified and intuitive user interface. Users
(Continued)

perform a constrained set graphical modifications in the 3D view using an input device, to modify a CAV.

12 Claims, 21 Drawing Sheets

Related U.S. Application Data

(60) Provisional application No. 62/156,730, filed on May 4, 2015.

(51) Int. Cl.
| | | |
|---|---|---|
| *G06F 15/00* | (2006.01) | |
| *G06F 3/048* | (2013.01) | |
| *G05B 19/4061* | (2006.01) | |
| *G05B 19/4099* | (2006.01) | |
| *G01B 7/008* | (2006.01) | |
| *G05B 19/4097* | (2006.01) | |

(52) U.S. Cl.
CPC ..... *G05B 19/4061* (2013.01); *G05B 19/4097* (2013.01); *G05B 19/4099* (2013.01); *G06F 3/048* (2013.01); *G06F 15/00* (2013.01); *G05B 2219/35134* (2013.01); *Y02P 90/265* (2015.11)

(58) Field of Classification Search
USPC .................................................. 33/502, 503
See application file for complete search history.

(56) References Cited

U.S. PATENT DOCUMENTS

| | | |
|---|---|---|
| 5,465,221 A | 11/1995 | Merat et al. |
| 5,471,406 A | 11/1995 | Breyer et al. |
| 7,058,472 B2 | 6/2006 | Mathews et al. |
| 7,146,291 B2 | 12/2006 | Hough |
| 7,652,275 B2 | 1/2010 | Gladnick |
| 7,783,445 B2 | 8/2010 | McLean et al. |
| 8,028,085 B2 | 9/2011 | Elien et al. |
| 8,302,031 B1 | 10/2012 | Sang |
| 8,438,746 B2 | 5/2013 | Usui |
| 2005/0276466 A1 | 12/2005 | Vaccaro et al. |
| 2005/0281453 A1 | 12/2005 | Boyer |
| 2005/0283989 A1 | 12/2005 | Pettersson |
| 2007/0071308 A1 | 3/2007 | Nakatani |
| 2010/0299945 A1 | 12/2010 | Lacy |
| 2011/0173827 A1 | 7/2011 | Bailey et al. |
| 2011/0231787 A1 | 9/2011 | Tseo et al. |
| 2012/0246953 A1* | 10/2012 | Engel ................... G01B 21/045 33/502 |
| 2013/0041624 A1 | 2/2013 | Li |
| 2014/0053423 A1* | 2/2014 | Brenner ................. G01B 5/012 33/503 |
| 2014/0152805 A1 | 6/2014 | Saeki et al. |
| 2015/0177729 A1* | 6/2015 | Atherton .............. G05B 19/401 700/180 |
| 2016/0010974 A1* | 1/2016 | Bumgardner .......... G01B 21/04 33/503 |
| 2016/0298958 A1* | 10/2016 | Yu ...................... G05B 19/4097 |
| 2016/0299493 A1* | 10/2016 | Yu ...................... G05B 19/4099 |

* cited by examiner

INSPECTION PROGRAM EDITING ENVIRONMENT PROVIDING USER DEFINED COLLISION AVOIDANCE VOLUMES WITH INTEGRAL MODIFICATION PROPERTIES

CROSS-REFERENCE TO RELATED APPLICATION(S)

This application is a continuation-in-part of PCT patent application No. PCT/US2016/030591, entitled "INSPECTION PROGRAM EDITING ENVIRONMENT PROVIDING USER DEFINED COLLISION AVOIDANCE VOLUMES" filed May 3, 2016, the disclosure of which is hereby incorporated herein by reference in its entirety.

BACKGROUND

Technical Field

This disclosure relates to precision metrology, and more particularly to inspection programs for coordinate measuring machines.

Description of the Related Art

Certain metrology systems including coordinate measurement machines (CMMs) can be utilized to obtain measurements of inspected workpieces and may be controlled at least in part by workpiece feature inspection operations that have been programmed on a computer. One exemplary prior art CMM is described in U.S. Pat. No. 8,438,746 (the '746 patent), which is hereby incorporated herein by reference in its entirety. As described in the '746 patent, the CMM includes a probe for measuring a workpiece, a movement mechanism for moving the probe, and a controller for controlling the movement mechanism.

A CMM which includes a surface scanning probe is described in U.S. Pat. No. 7,652,275 (the '275 patent), which is hereby incorporated herein by reference in its entirety. After a scan, a three dimensional profile of the workpiece is provided. The workpiece may be measured by a mechanical contact probe scanning along the workpiece surface, or by an optical probe which scans a workpiece without physical contact. Optical probes may be of a type that may use points of light for detecting surface points (such as triangulation probes), or a type that uses a video camera, wherein the coordinates of geometric elements of the workpiece are determined via image processing software. A "combined" CMM that uses both optical and mechanical measuring is described in U.S. Pat. No. 4,908,951, which is hereby incorporated herein by reference in its entirety.

In all of the above described CMMs, operations may be programmed for inspecting workpiece features. The workpiece features and certain CMM components may be represented in computer aided design (CAD) files. The programmed operations for inspecting the workpiece features may generally be reviewed to see which workpiece features are being inspected and in what order, and may also be edited by adding, removing or otherwise altering particular program element operations that are associated with particular workpiece features. However, in existing CMM programming systems, such reviewing and editing operations are not always easy for a user to perform or to understand, and it may also be difficult for a user to program CAD models for certain types of workpiece features and/or CMM components. For example, it may be difficult for a user to track where and how such programmed operations fit within an overall inspection plan, different windows may be provided with different types of information about the programmed operations and/or workpiece features and CMM components, and it may difficult to understand the various effects that certain types of edits may produce relative to altering the efficiency or effectiveness for the inspection of a particular workpiece feature or for the overall inspection plan. A need exists for a system and/or user interface features which simplify the program creation and editing processes, and which allow for the understanding of the effects of various types of edits in an immediate and intuitive manner during inspection program creation, review and/or editing for a CMM.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system is provided for programming workpiece feature inspection operations for a coordinate measuring machine. The coordinate measuring machine (CMM) may include at least one sensor used for determining workpiece feature measurement data, a stage for holding a workpiece wherein at least one of the sensor or the stage are movable relative to one another, and a CMM control portion. The system includes a computer aided design (CAD) file processing portion, an inspection motion path generation portion and a user interface. The computer aided design (CAD) file processing portion inputs a workpiece CAD file corresponding to a workpiece and analyzes the file to automatically determine inspectable workpiece features on the workpiece corresponding to a plurality of geometric feature types. The inspection motion path generation portion automatically generates at least part of an inspection motion path used in an inspection program generated by the system for inspecting the workpiece represented by the input workpiece CAD file.

In various implementations, the user interface may include a workpiece inspection program simulation portion and one or more auxiliary collision avoidance volume creation elements. The workpiece inspection program simulation portion may be configured to display a 3D view including at least one of workpiece features on the workpiece or inspection operation representations (e.g., measurement points, movements, angles, etc.) corresponding to inspection operations to be performed on workpiece features according to a current workpiece feature inspection plan. The one or more auxiliary collision avoidance volume creation elements may be operable to perform operations that at least one of create or define an auxiliary collision avoidance volume that is displayed as a 3D collision avoidance volume representation in the 3D view.

In various implementations, the 3D collision avoidance volume representation may have graphical modification properties which are controllable by a user in the user interface, and the modification properties are activated by user selection of a face of the 3D collision avoidance volume representation in the user interface (e.g. by using an input device), without the explicit activation of a separate modification control element mode or modification control tool. A 3D collision avoidance volume representation that has integrated modification properties that may be activated without the explicit activation of a separate modification control element mode or modification control tool allows a more simplified and intuitive user interface that is more easily learned and operated, particularly by relatively unskilled users. In various implementations, a user may operate various graphical modification properties in the 3D view, using an input device, in order to modify the 3D collision avoidance volume.

In various implementations, the defined auxiliary collision avoidance volume resulting from the operation of the auxiliary collision avoidance volume creation elements and subsequent modifications may be operable within the context of the user interface of the system for programming workpiece feature inspection operations, but may not be operable to modify the physical features of the workpiece represented in the input workpiece CAD file. In various implementations, the inspection motion path generation portion may automatically generate an inspection motion path configured to avoid an auxiliary collision avoidance volume such that moving parts of the CMM do not enter the auxiliary collision avoidance volume during the execution of the inspection program generated by the system for inspecting the workpiece represented by the input workpiece CAD file.

DETAILED DESCRIPTION

Figure 1:
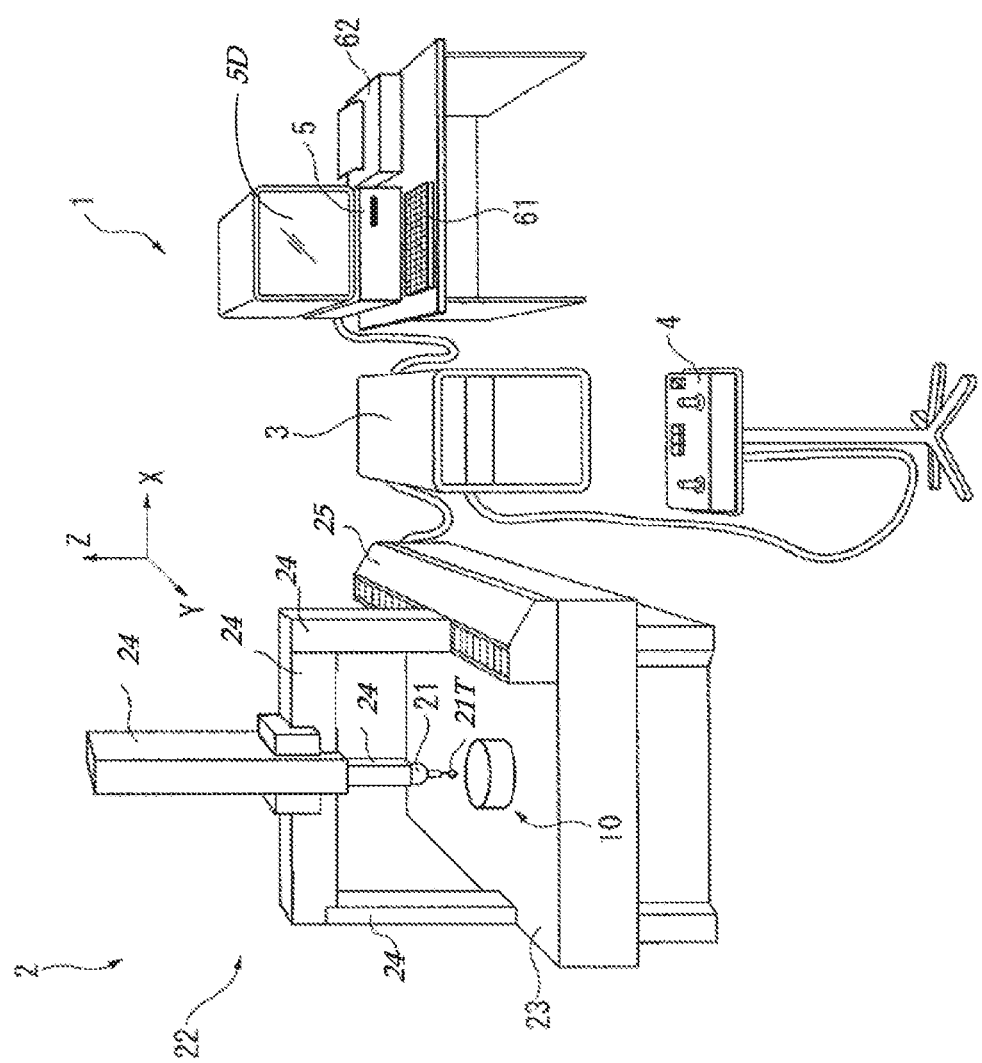
FIG. 1 is a diagram showing various typical components of a metrology system comprising a CMM.

FIG. 1 is a diagram showing various typical components of a metrology system 1 including a generic CMM, which provides one context for application of the principles disclosed herein. Certain aspects of the metrology system 1 are further described in the previously incorporated '746 patent. The metrology system 1 may include: a CMM body 2; a motion controller 3 that controls a drive of the coordinate measuring machine body 2; an operating unit 4 for manually operating the coordinate measuring machine body 2; a host computer 5 that issues commands to the motion controller 3 and executes processing such as for the inspection of features on a workpiece 10 (an object to be measured) disposed on the CMM body 2. A representative input unit 61 and output unit 62 are connected to the host computer 5, as well as a display unit 5D. The display unit 5D may display a user interface, for example as described further below with respect to FIGS. 3-11.

The CMM body 2 may include: a probe 21 having a stylus 21T which may contact a surface of the workpiece 10; a movement mechanism 22 that includes a three axis slide mechanism 24 that holds the base end of the probe 21; a measurement stage 23 that holds the workpiece 10 and on which the a drive mechanism 25 moves the slide mechanism 24. In various implementations, the drive mechanism 25 may be controlled by a CMM control portion (e.g., including the motion controller 3). As will be described in more detail below, in various implementations one or more sensors of the CMM (e.g., including the probe 21 and/or stylus 21T) may be moved relative to the measurement stage 23 (e.g., as controlled by the motion controller 3) and utilized for determining workpiece feature measurement data (e.g., with regard to physical dimensions of features of the workpiece 10).

Figure 2A:
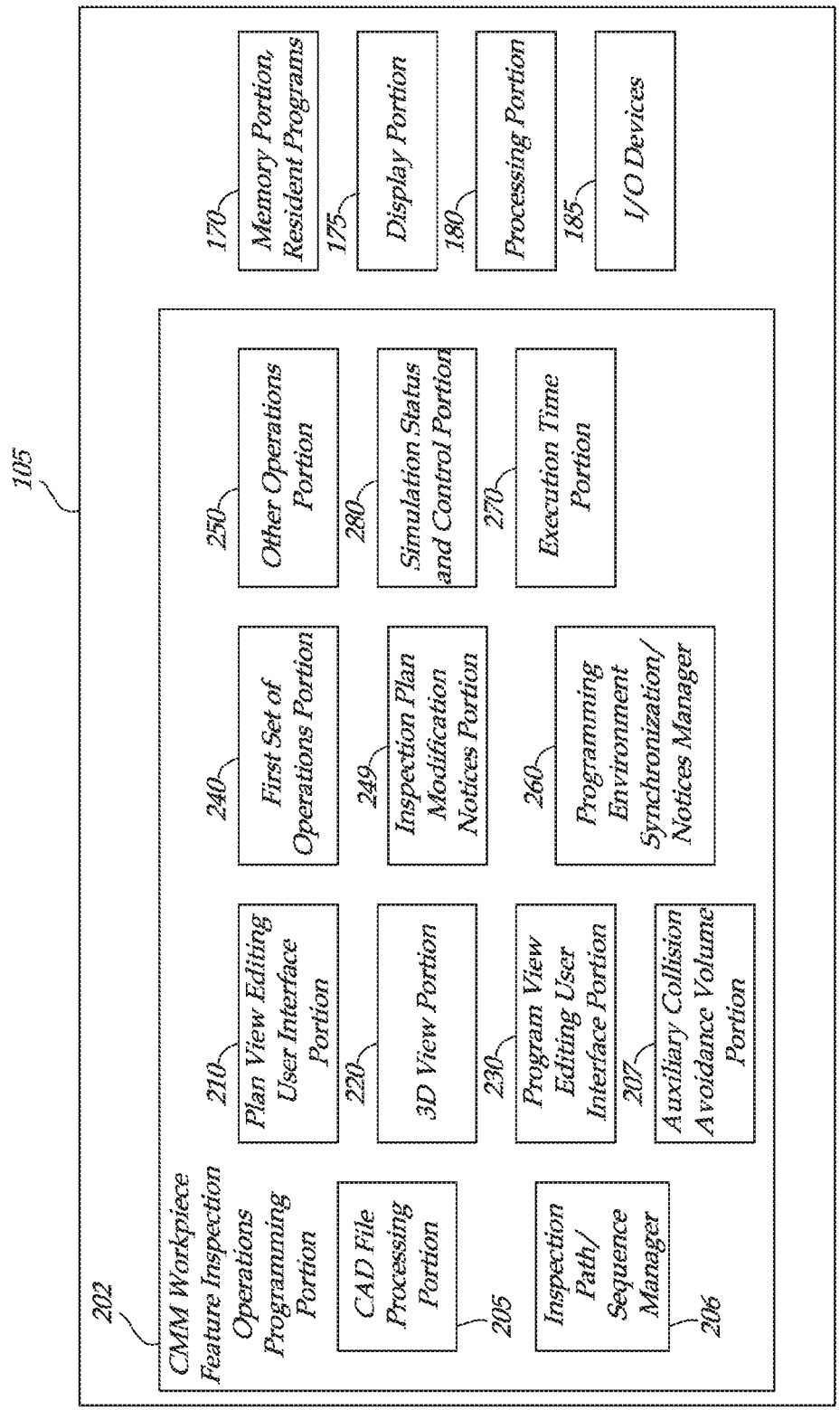
FIGS. 2A and 2B are diagrams showing various elements of one embodiment of a computing system on which workpiece feature inspection operations may be programmed for the CMM of FIG. 1.
Figure 2B:
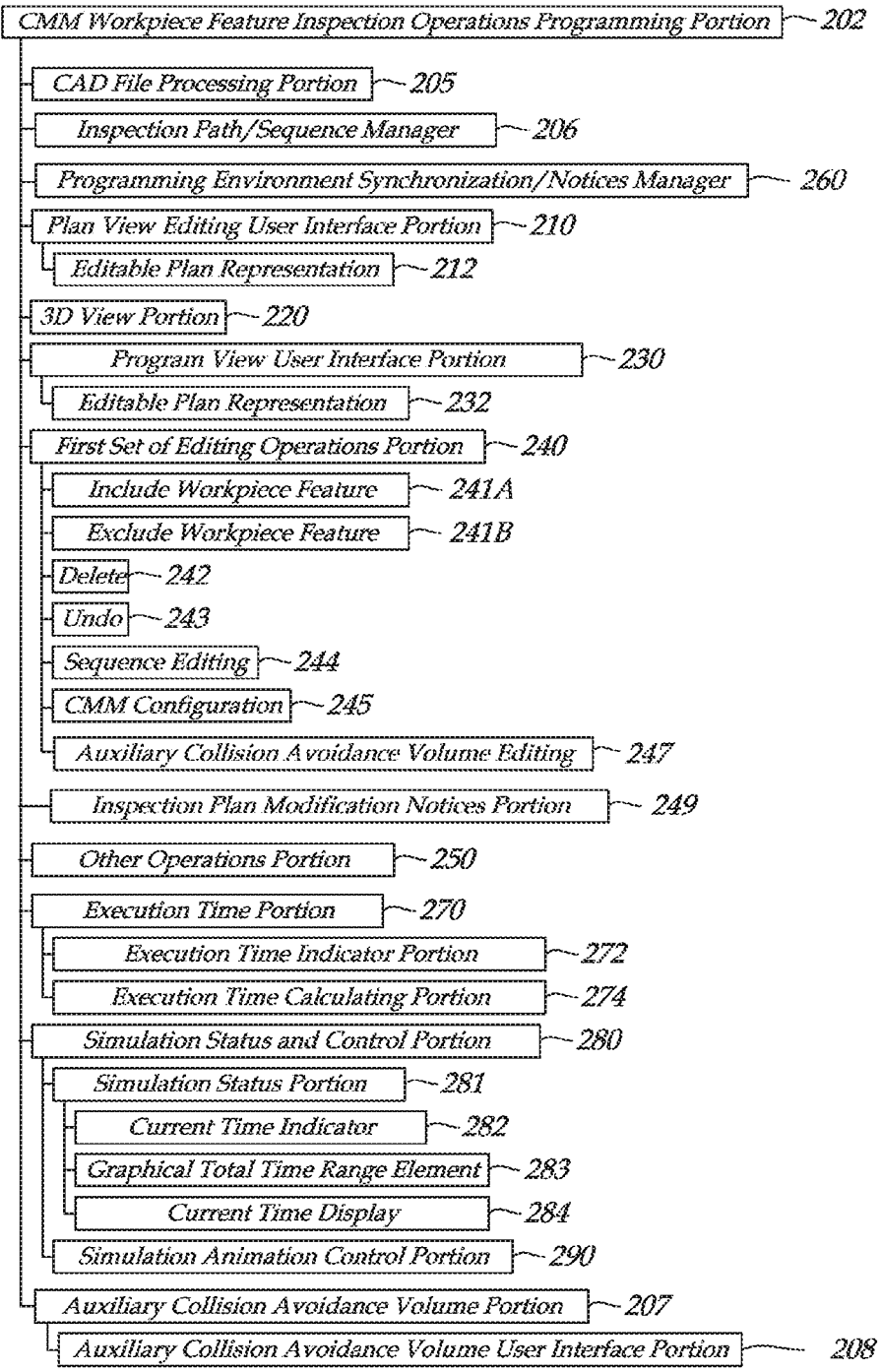

FIGS. 2A and 2B are diagrams of a computing system 105 including various elements of one embodiment of a programming portion 202 on which workpiece feature inspection operations may be programmed for a CMM (e.g., the CMM 2 of FIG. 1). As shown in FIG. 2A, in various implementations the computing system 105 (e.g., the computer 5 of FIG. 1 or a separate computer) may include a memory portion 170, a display portion 175, a processing portion 180, an input-output devices portion 185 and the programming portion 202. The memory portion 170 includes resident programs and other data utilized by the computing system 105. The display portion 175 provides the display for the computing system 105 (e.g., similar to the display 5D of FIG. 1), including the features provided by the programming portion 202. The processing portion 180 provides for the signal processing and control of the computing system 105, while the input-output devices portion 185 receives and provides control signals and outputs to and from various devices (e.g. the CMM controller 3 of FIG. 1).

As shown in FIGS. 2A and 2B, in one embodiment, the programming portion 202 includes a CAD file processing portion 205, an inspection path and/or sequence manager 206, an auxiliary collision avoidance volume portion 207, a plan view editing user interface portion 210, a 3D view portion 220, a program view editing user interface portion 230, a first set of operations portion 240, an inspection plan modification notices portion 249, an other-operations portion 250, a programming environment synchronization and/or notices manager 260, an execution time portion 270, and a simulation status and control portion 280. In various implementations, the computer aided design (CAD) file processing portion 205 inputs a workpiece CAD file corresponding to a workpiece (e.g., the workpiece 10 of FIG. 1) and analyzes the file to automatically determine inspectable workpiece features on the workpiece corresponding to a plurality of geometric feature types (e.g., cylinder, plane, sphere, cone, etc.). The computer aided design (CAD) file processing portion 205 may further input a CMM CAD file corresponding to a CMM which is to be operated using the program created by the programming portion 202, and analyze the CMM CAD file to automatically determine a displayable representation of the CMM that may be used by the 3D view portion 220, as well as geometric characteristics usable for certain inspection path planning analysis (e.g. collision avoidance analysis) by the inspection path/sequence manager 206. More generally, the inspection path/sequence manager 206 may automatically determine a motion control path that allows the CMM to obtain measurements that characterize the workpiece features. Methods usable for implementing the CAD file processing portion 205 and/or the inspection path/sequence manager 206 are known in the art, as exemplified in various commercial CAD products, and/or in CAD "extension programs" for creating inspection programs and/or other known CMM inspection programming systems and/or systems which automatically generate machine tool programs from CAD data. For example, U.S. Pat. Nos. 5,465,221; 4,901,253; 7,146,291; 7,783,445; 8,302,031; 5,471,406 and 7,058,472, each of which is hereby incorporated herein in their entirety, disclose various methods which may be used to analyze CAD data and determine geometric features of a workpiece and then automatically generate a motion control path for placing a probe or sensor at inspection points that measure or characterize the geometric features. European Patent Number EP1330686 also provides relevant teachings. In some embodiments, determining the geometric features may simply comprise extracting or recognizing the categorized geometric features inherently defined in some modern CAD systems. In some embodiments, product and manufacturing information (PMI, for short) is present in the CAD data, and may be used in the aforementioned processes. PMI may convey non-geometric attributes in CAD data, and may include geometric dimensions and tolerances, surface finish, and the like. In some embodiments, in the absence of PMI, default tolerances and other default inspection rules may be used in automatic operations of the CAD file processing portion 205 and the inspection path/sequence manager 206.

The motion control path may generally define a feature inspection sequence as well as individual inspection points (e.g. touch probe measurement points, or non-contact measurement points, or point cloud determination regions, etc.), as well as the motion path between such points. The sequence and motion path planning may follow simple rules that avoid collisions in some embodiments, or more complicated rules or processes that both avoid collisions and optimize motion path length or inspection time in other embodiments. In some embodiments, the CAD file processing portion 205 may include the inspection path/sequence manager 206, or they may be merged and/or indistinguishable. Applicable automatic path planning methods may be found in commercial products and/or the previously cited references, as well as in numerous technical and/or academic articles. In one embodiment, one or both of the aforementioned automatic processes may be automatically triggered when a target CAD file is identified in the programming portion 202. In other embodiments, one or both of the aforementioned automatic processes may be triggered in relation to a target CAD file based on operator input that initiates the processes. In other less desirable embodiments, similar processes may be semi-automatic and require user input in the programming portion 202 for certain operations or decisions.

In any case, in various embodiments the aforementioned processes may, in effect, be used to provide a comprehensive inspection plan and/or inspection program for a workpiece. In some contexts, the connotations of the term "inspection plan" may encompass primarily what features are to be inspected and what measurements are to be made on each, and in what sequence, and the connotations of the term "inspection program" may encompass how the inspection plan is to be accomplished on a particular CMM configuration (e.g. following the "instructions" inherent in the inspection plan, but also including the motion speeds and path, the probe or sensor to be used, and so on for a defined CMM configuration.) Other portions of the programming portion 202 may use the results of the CAD file processing portion 205 and the inspection path/sequence manager 206 to perform their operations and populate and/or control their associated user interface portions, and the like. As shown in FIG. 2B, the plan view editing user interface portion 210 includes an editable plan representation 212 of a workpiece feature inspection plan for the workpiece corresponding to the CAD file. In various implementations, the program view editing user interface portion 230 may also (or instead) include an editable plan representation 232, as will be described in more detail below with respect to FIGS. 3-9.

The auxiliary collision avoidance volume portion 207 shown in FIGS. 2A and 2B, which generally includes auxiliary collision avoidance volume user interface portion 208 as shown in FIG. 2B, may be operated by a user of the programming portion 202 to create or define auxiliary collision avoidance volumes, such as illustrated and described below with reference to FIGS. 3-14. In contrast to known "collision buffer zone" methods that are programmed to automatically provide a buffer or clearance zone around physical objects defined in a workpiece CAD file or a CAD file of the CMM component parts, the system and method for creating or defining auxiliary collision avoidance volumes disclosed herein allows for the creation of additional collision avoidance volumes in an "ad hoc" manner, by a user of the programming portion 202. For example, in one embodiment, a user who may not have the authority to alter workpiece CAD files or CMM CAD files may still add such auxiliary collision avoidance volumes, according to principles disclosed herein. Such auxiliary collision avoidance volumes may be defined independently of any features in imported CAD files, although a user may choose to surround such features with auxiliary collision avoidance volumes, if desired (e.g. as illustrated in FIG. 10). More specifically, an auxiliary collision avoidance volume may be defined by a user so as to enclose all or part of a physical element that is modeled in a CAD file, or alternatively may not enclose any part of a physical element that is modeled in a CAD file.

A user may wish to create or define an auxiliary collision avoidance volume that acts as a surrogate or substitute "avoidance zone" for CMM or workpiece fixturing that is presently undefined or unknown, in order to define a safely operable inspection program without requiring a user to define or draw such fixturing in a separate CAD program. It will be appreciated that in typical prior art systems, a user was required to engage in the time consuming process of modeling or importing all CMM or workpiece fixturing in CAD files, even if some of the fixturing was unknown or was not going to be inspected. In some cases, it may be desirable if the auxiliary collision avoidance volume is associated so as to be fixed relative to the CMM in the programming portion 202, as described further below with reference to FIGS. 6 and 10. Similarly, an auxiliary collision avoidance volume may be created or defined that acts as a surrogate or substitute "avoidance zone" for somewhat unpredictable features on a workpiece.

For example, a somewhat "oversized" substitute avoidance zone in the location of expected but somewhat unpredictably formed sprues or vents on a cast workpiece may allow the part to be safely inspected by a program based on the finished workpiece CAD file, while it is still in process with the sprues and vents still attached. In such a case, it may be desirable if the auxiliary collision avoidance volume is associated to move with the workpiece in the programming portion 202, as described further below with reference to FIGS. 5, 6, 10 and 11. As another example, a user of the programming portion 202 may simply wish to reserve an auxiliary collision avoidance volume on the CMM at a location where it is safe to set tools or personal items. In general, it will be appreciated that rather than requiring a user to model a physical object (e.g., as part of a workpiece or CMM) in a CAD file, the user may instead position an auxiliary collision avoidance volume at a location where the physical object is expected to be, so as to prevent collisions that could occur with the physical object. In various implementations, the dimensions and location of a created or defined auxiliary collision avoidance volume may be input to the inspection path/sequence manager 206, which may include an inspection motion path generation portion which is utilized to create a compatible inspection program motion path that avoids collisions or intrusions of the CMM into that volume, according to known methods for avoiding physical elements.

In various implementations, the programming portion 202 may save the configuration of the inspection program creation or editing session according to known methods (e.g. in a project file), for example by saving links to, or copies of, the relevant workpiece CAD file and CMM configuration file, as well as saving data that characterizes the state of the programming and/or editing operations corresponding to the inspection plan and/or inspection program at the time the project file is saved (e.g. in the memory portion 170). In various implementations, for the CMM configuration file, the CAD file processing portion 205 may input a CMM CAD file corresponding to the CMM and may analyze the CMM CAD file to automatically determine a displayable representation of the CMM. In some embodiments, the creation or definition of the auxiliary collision avoidance volumes may be saved and recalled in the data that characterizes the state of the programming and/or editing operations corresponding to the inspection plan and/or inspection program at the time the project file is saved. In other embodiments, the creation or definition of the auxiliary collision avoidance volumes may be saved in a special purpose file that is later recalled and processed similar to the CMM configuration file, or the like, when reopening a project file. In other embodiments, the creation or definition of the auxiliary collision avoidance volumes may be saved in an altered "local" copy of the workpiece CAD file or CMM configuration file, that is later recalled and processed (rather than the original CAD file or CMM configuration file), when reopening a project file. All of the foregoing methods have the advantage of not altering the original CAD file or CMM configuration file. However, the foregoing methods are intended to be exemplary only, and not limiting. Other implementations may be used, including altering (supplementing) the original CAD file or CMM configuration file to be recalled when the file is reopened in the project, if desired.

In some cases, it may be desirable if the auxiliary collision avoidance volume creation elements (e.g. in the defined auxiliary collision avoidance volume user interface portion 208) that are used to create or define the auxiliary collision avoidance volumes are immediately and locally available in the programming portion 202, in order to avoid the expense of a separate CAD application. In some cases, it may be desirable if the auxiliary collision avoidance volume creation elements that are used to create or define the auxiliary collision avoidance volumes are made to be unable to modify the features of the workpiece CAD file or the CMM CAD file or their local representations (e.g. they are not provided by a fully functional CAD application, or a link thereto) so that the workpiece features and/or CMM elements are not altered in an unauthorized manner while creating or editing the inspection program.

In various implementations, one or more of the auxiliary collision avoidance volume creation elements may be accessible in a workpiece inspection program simulation portion (e.g., in the 3D view portion 220) for at least one of creating or defining an auxiliary collision avoidance volume. The auxiliary collision avoidance volume creation elements may include elements for defining a size and a location of the auxiliary collision avoidance volume. In various implementations, the display in the 3D view may automatically be updated to display an auxiliary collision avoidance volume as it has been created or defined.

In various implementations, one or more of the auxiliary collision avoidance volume creation elements may be accessible in the editable plan representation 212 for creating or defining an auxiliary collision avoidance volume. The one or more auxiliary collision avoidance volume creation elements may include a context dependent menu for at least one of creating or defining the auxiliary collision avoidance volume. The plan view and a displayed execution time indicator may automatically be updated in accordance with changes caused by an auxiliary collision avoidance volume as it has been created or defined.

In various implementations, an auxiliary collision avoidance volume may be associated to move with one of the workpiece or the CMM and may be designated differently than either a workpiece feature or a CMM physical object (e.g., in the editable plan representation 212 or 232). For example, the auxiliary collision avoidance volume creation elements may include operations that at least one of define or associate an auxiliary collision avoidance volume to move with the workpiece if the workpiece is relocated relative to the CMM in the system for programming workpiece feature inspection operations. As another example, the auxiliary collision avoidance volume creation elements may include operations that at least one of define or associate the auxiliary collision avoidance volume to remain in a fixed position relative to the CMM if the workpiece is relocated relative to the CMM in the system for programming workpiece feature inspection operations.

Although it has been known to attempt to automatically generate an inspection plan and/or inspection program, subsequent editing and visualization of that plan and/or program have not been sufficiently intuitive or easy to use—particularly for relatively unskilled users. In particular, visualization of the effect of editing changes to the plan and/or program has not been immediately or continuously available in the user interface (e.g. through a displayed "3D" simulation or moving animation). Rather, it has been typical to require the user to activate a special mode or display window that is not normally active in real time during editing operations in order to see a "recording" or specially generated simulation of the CMM running the edited inspection program. Similarly, the effect of editing changes to the plan and/or program on the total execution time of the inspection plan or program has not been immediately or continuously available in real time in the user interface during editing operations. Both types of "results" feedback—"immediate" visual confirmation of the editing results in a 3D simulation or animation view, and/or immediate confirmation of the editing results on the total execution time may be critical to the acceptance of an editing operation. For example, the total execution time relates directly to the inspection throughput of a CMM, which determines its cost of ownership and/or ability to support a desired rate of production.

Due to the value of such immediate feedback, particularly for relatively unskilled users or program editors, in some embodiments it is desirable for editing operations to be immediately incorporated (e.g. automatically or with very minimal effort by the user) into the current version of the inspection plan and/or inspection program, which is then reflected in the various portions of the programming portion 202 and its user interface(s). In the illustrated embodiment, this may be accomplished through the operations of the programming environment synchronization/notices manager 260, which in one embodiment may be implemented using known "publisher-subscriber" methods, which are sometimes implemented using XML like languages (e.g., as used for notifications between web pages). In various embodiments, a publisher-subscriber method may be implemented by adapting methods such as a list-based method, or a broadcast-based method, or a content-based method to support the features disclosed herein. In a CMM programming environment, the publishers and subscribers are generally located in the same processing space, and it is possible for the identity of the "subscriber" windows to be known by the "publisher" (e.g. as may be recorded or implemented using the programming environment synchronization/notices manager 260, for example.) Applicable to such cases, U.S. Pat. No. 8,028,085, which is hereby incorporated herein by reference in its entirety, describes low latency methods which may be adapted to support the features disclosed herein.

In one embodiment, determining and/or generating various workpiece features and measurement operations in the CAD file processing portion 205 and the inspection path/sequence manager 206 may include generating and/or sharing a unique identifier for each workpiece feature and measurement operation. Depending on the specific implementation, one of the CAD file processing portion 205 or the inspection path/sequence manager 206 may also be triggered or notified to generate a unique identifier for any auxiliary collision avoidance volumes created or defined in the programming portion 202 according to principles disclosed herein. Alternatively, in some implementations, the auxiliary collision avoidance volume portion 207 may generate such unique identifiers. In any case, when the results from those portions are used in other portions of the programming portion 202 (e.g. as outlined above), the various identifiers may also be used or cross-referenced in the other portions to establish relevant associations between corresponding workpiece features and/or inspection operations across the various processing and/or user interface portions.

The user interface of the programming portion 202 includes a first set of editing operations (which also include the underlying programming instructions and/or routines) usable to edit the workpiece feature inspection plan and/or inspection program. For example, the user interface operations may include selections of text or graphical elements that represent workpiece features or inspection operations or auxiliary collision avoidance volumes, followed by activation of relevant commands or other user interface operations that affect the selected elements. In one embodiment, the first set of editing operations portion 240 may provide or identify such operations. In one embodiment, the inspection plan modification notices portion 249 may be responsive to operations included in the first set of editing operations portion 240 to provide a notice to the programming environment synchronization/notices manager 260 that an inspection plan modification is taking place.

In response, the programming environment synchronization/notices manager 260 may then (e.g. automatically) manage the exchange of various event or programming operation notifications and related unique identifiers, such that the CAD file processing portion 205 and/or the inspection path/sequence manager 206 appropriately edit or modify the current inspection plan and inspection program in a synchronized manner when one of the first set of editing operations is performed. Such plan and program modifications may be performed very quickly in various embodiments, because the unique identifiers described above may be used to efficiently focus the modifications on only those features and/or measurement operations affected by the currently active one of the first set of editing operations. After that, the programming environment synchronization/notices manager 260 may notify other portions of the programming portion 202 (e.g. as outlined above), so that they are immediately updated using information from the edited plan and/or program. The unique identifier(s) of the most recently edited elements may again be used to speed up such operations, in that the updating need only focus on those elements associated with the identifiers.

It should be appreciated that the programming environment synchronization/notices manager 260 may also manage inter-portion communications and exchanges besides those associated with the first set of editing operations (e.g. using various techniques and identifiers similar to those outlined above.) In various embodiments, it may facilitate the synchronization between the various user interface windows or portions of the programming portion 202. For example, selection of a particular feature or instruction or auxiliary collision avoidance volume in one window may automatically trigger a notification or instruction to other windows to display a corresponding feature or instruction in that other window, or depict a program operating state associated with the selected feature or instruction or auxiliary collision avoidance volume, or the like.

It will be appreciated that the embodiment(s) outlined above for achieving real time editing operation synchronization between various portions of the programming portion 202 are intended to be exemplary only, and not limiting. For example, the function of the identifiers outlined above may be provided by suitable database or lookup table associations or the like, without the presence of an explicit "identifier". These and other alternatives will be apparent to one of ordinary skill in the art based on the teachings disclosed herein.

The execution time portion 270 may include an execution time indicator portion 272 and an execution time calculating portion 274. In order to provide valuable feedback to a user performing editing operations, the execution time indicator portion 272 may provide a "real time" indication of an estimated inspection program execution time for operating the CMM to execute a workpiece inspection program corresponding to the current workpiece feature inspection plan as executed by a current CMM configuration. Using the techniques outlined above, the programming portion 202 may be configured such that the execution time indicator portion 272 is automatically updated in response to a utilization of one of the operations included in the first set of editing operations portion 240 to modify the current workpiece feature inspection plan and/or motion path, so as to automatically indicate the estimated effect of the modification on the inspection program execution time. In various implementations, the first set of editing operations portion 240 may include or identify operations corresponding to inclusion of a workpiece feature 241A, exclusion of a workpiece feature 241B, a delete command 242, an undo command 243, sequence editing 244 and altering a CMM configuration 245, and auxiliary collision avoidance volume editing 247 (e.g. creating, modifying, deleting an auxiliary collision volume, etc.) each of which will be described in more detail below with respect to FIGS. 3-14. The first set of editing operations portion 240 may further include or identify operations corresponding to adding or deleting individual measurement points (e.g. touch points for a stylus) on a feature, or changing the motion plan for traversing between individual measurement points, or the like. The other operations portion 250 may include other operations relevant to the use and functioning of the programming portion 202 and/or general computing system 105. The 3D view portion 220 may display a 3D view including workpiece features on the workpiece, auxiliary collision avoidance volumes created by a user as disclosed herein, and an indication of inspection operations to be performed on the workpiece features according to the current workpiece feature inspection plan. The simulation status and control portion 280 may include a simulation status portion 281 that is configured to characterize a state of progress through the current workpiece feature inspection plan corresponding to a currently displayed 3D view, and the execution time indicator portion 272 may be displayed in conjunction with the simulation status portion 281.

In various implementations, the simulation status portion 281 may include a current time indicator 282 that moves along a graphical total time range element 283 to characterize a state of progress through the current workpiece feature inspection plan corresponding to the currently displayed 3D view, and the execution time indicator 272 may be displayed in association with the graphical total time range element 283. In one implementation, the simulation status portion 281 further includes a current time display 284 which includes a numerical time representation that is automatically updated corresponding to the current time indicator 282 or the currently displayed 3D view, and that further characterizes the state of progress through the current workpiece feature inspection plan corresponding to the currently displayed 3D view. In one implementation, the simulation status and control portion 280 further includes a simulation animation control portion 290 which includes elements that are usable to control at least one of a start, pause, stop, reset, reverse, loop, increase in speed or decrease in speed—of an animated display of simulated progress through the current workpiece feature inspection plan as displayed in the 3D view.

In various implementations, the computing system 105 and/or other associated computer system(s) may include suitable unitary or distributed computing systems or devices, which may include one or more processors that execute software to perform the functions described herein. Processors include programmable general-purpose or special-purpose microprocessors, programmable controllers, application specific integrated circuits (ASICs), programmable logic devices (PLDs), or the like, or a combination of such devices. Software may be stored in memory, such as random access memory (RAM), read-only memory (ROM), flash memory, or the like, or a combination of such components. Software may also be stored in one or more storage devices, such as disk drives, solid-state memories, or any other medium for storing data. Software may include one or more program modules which include routines, programs, objects, components, data structures, and so on that perform particular tasks or implement particular abstract data types. In distributed computing environments, the functionality of the program modules may be combined or distributed across multiple computing systems or devices and in various implementations may be accessed via service calls.

Figure 3:
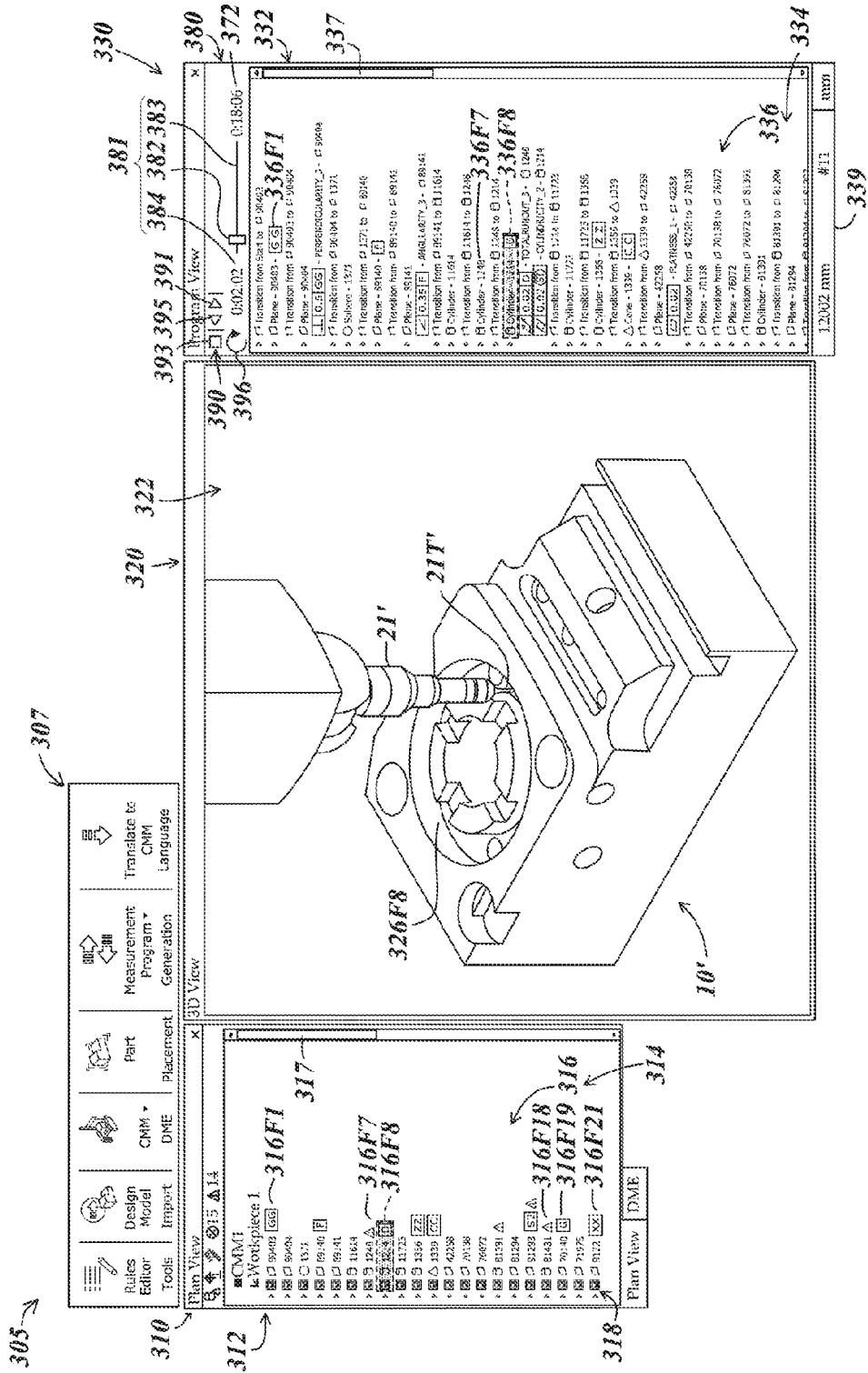
FIG. 3 is a diagram of a user interface in which all of the workpiece features of an editable plan representation are included in a set of workpiece features to be inspected according to the plan.

FIG. 3 is a diagram of a user interface 305 (e.g. as may be shown on the display 5D of FIG. 1, the display portion 175 of FIG. 2A, etc.) It will be appreciated that certain numbered elements 3XX of the user interface 305 may correspond to and/or be provided by similarly numbered elements 2XX of FIGS. 2A and 2B, except as otherwise described below. Various aspects of the user interface and other corresponding elements are described in more detail in copending and commonly assigned U.S. patent application Ser. No. 14/682,976, entitled "Inspection Program Editing Environment Including Real Time Feedback Related to Throughput", filed on Apr. 9, 2015, and in commonly assigned U.S. patent application entitled "Inspection Program Editing Environment With Simulation Status and Control Continually Responsive To Selection Operations", filed concurrently herewith, each of which are hereby incorporated by reference herein in their entirety.

In the implementation shown in FIG. 3, the user interface 305 includes a menu bar 307, a plan view window 310, a 3D view window 320 and a program view window 330. The menu bar 307 includes various selection elements, such as for "rules editor/tools", "design model/import", "CMM/ DME"; "part/placement", "measurement program/generation" and "translate to CMM language". The plan view window 310 includes an editing user interface portion 312, the 3D view window 320 includes a workpiece inspection program simulation portion 322, and the program view window 330 includes an editing user interface portion 332 and a simulation status and control portion 380. The editing user interface portions 312 and 332 each include plan representations 314 and 334, respectively, of a workpiece feature inspection plan for a workpiece 10 corresponding to a CAD file.

The plan representation 314 is organized in terms of geometric features to be inspected on a workpiece. The plan representation 334 is organized as inspection program pseudo-code or actual code or graphical program operation representations or the like, in various embodiments. In the illustrated embodiment, each or both of the plan representations 314 and 334 are editable (that is, they are editable plan representations.) When editing operations are performed for one of the editable plan representations 314 and 334, the other plan representation may be automatically updated in a manner consistent with those editing operations by operation of the various system elements illustrated and described with respect to FIGS. 2A and 2B. However, in some embodiments, only one of the plan representations 314 and 334 need be editable. In such a case, the other plan representation may be absent, or hidden, or may be displayed and automatically updated in manner similar to that outlined above.

As described above with respect to FIGS. 2A and 2B, in various implementations, a computer aided design (CAD) file processing portion may input a workpiece CAD file corresponding to a workpiece 10 and may analyze the file to automatically determine inspectable workpiece features on the workpiece 10 corresponding to a plurality of geometric feature types (e.g., cylinder, plane, sphere, cone, etc.) In FIG. 3, the editing user interface portions 312 and 332 include editable plan representations 314 and 334 of the workpiece feature inspection plan for the workpiece 10 corresponding to the CAD file, wherein the editable plan representations 314 and 334 include an editable set of workpiece features 316 and 336 to be inspected. In various implementations, editable plan representations and/or other elements of respective CAD files that correspond to different workpieces may be stored with respect to the different workpieces. In such configurations, a user may select a workpiece from a menu or utilize other means of accessing stored workpieces (e.g., a user having selected a "Workpiece 1" as represented in the plan view window 310 and as corresponding to the workpiece 10' of the 3D view window 320). In response to such a selection, as illustrated in the plan view window 310, the selected workpiece (e.g., "Workpiece 1") may be indicated, with a corresponding editable plan representation (e.g., editable plan representation 314) also displayed.

As also described above with respect to FIGS. 2A and 2B, the CAD file processing portion may further input a CMM CAD file corresponding to a CMM which is to be operated using the program created by the programming portion, and analyze the CMM CAD file to automatically determine a displayable representation of the CMM that may be displayed in the 3D view window 320, as well as geometric characteristics usable for certain inspection path planning analysis (e.g. collision avoidance analysis) by an inspection path/sequence manager. In such configurations, a user may select a CMM configuration from a menu or utilize other means of accessing stored CMM configurations (e.g., a user having selected a "CMM 1" as represented in the plan view window 310 and as corresponding to a touch probe 21' and stylus 21T' in the 3D view window 320, and for which other elements of a CMM configuration may also be displayed, such as changing racks, hardware areas, etc., as will be described in more detail below with respect to FIG. 10).

An execution time indicator 372 is provided that is indicative of an estimated inspection program execution time for operating the CMM to execute a workpiece inspection program corresponding to the current workpiece feature inspection plan as executed by a current CMM configuration. As will be described in more detail below, when one or more auxiliary collision avoidance volume creation elements are utilized to create and/or define an auxiliary collision avoidance volume, such operations may result in modifications to a workpiece feature inspection plan. In response to such modifications, the system is configured such that the execution time indicator 372 is automatically updated so as to automatically indicate the estimated effect of the modifications on the inspection program execution time. In addition to modifications caused by auxiliary collision avoidance volumes, such modifications may also result from other operations (e.g., the editing of the workpiece feature inspection plan by a user, etc.).

The 3D view portion 320 displays a 3D view of the workpiece inspection program simulation portion 322 including workpiece features 326 on the workpiece 10' and an indication of inspection operations to be performed on the workpiece features 326 according to the current workpiece feature inspection plan. In the example of FIG. 3, the 3D view shows the touch probe 21' having the stylus 21T', which is positioned relative to the workpiece 10'. In the state illustrated, the touch probe stylus 21T' is contacting a cylinder workpiece feature 326F8, which corresponds to the workpiece features 316F8 and 336F8 which are highlighted in the editable plan representations 314 and 334, respectively. In the editable plan representation 334 the workpiece feature 336F8 includes a description of "cylinder—1214" along with a displayed cylinder icon, and in the editable plan representation 314 the workpiece feature 316F8 includes a description of "1214" along with a displayed cylinder icon. Such descriptions and icons may be automatically generated and displayed as corresponding to a numbered designation and geometric type (e.g., cylinder, plane, sphere, cone, etc.) for each of the workpiece features.

The simulation status and control portion 380 may include a simulation status portion 381 and a simulation animation control portion 390. Using synchronization techniques outlined above, for example, the simulation status portion 381 may be configured to characterize a state of progress through the current workpiece feature inspection plan corresponding to a currently displayed 3D view of the workpiece inspection program simulation portion 322. In various implementations, the simulation status portion 381 may include a current time indicator 382 that moves along a graphical total time range element 383 to characterize a state of progress through the current workpiece feature inspection plan corresponding to the currently displayed 3D view, and the execution time indicator 372 may be displayed in association with the graphical total time range element 383. In one implementation, as illustrated in the example of FIG. 3, the execution time indicator 372 may be displayed in the vicinity of the right-hand end of the graphical total time range element 383.

In one implementation, the simulation status portion 381 may further include a current time display 384 displayed in the vicinity of at least one of the current time indicator 382 or the total time range element 383, and the current time display 384 may include a numerical time representation that is automatically updated corresponding to the current time indicator 382 or the currently displayed 3D view, and that further characterizes the state of progress through the current workpiece feature inspection plan corresponding to the currently displayed 3D view. In the example of FIG. 3, the current time display 384 indicates a time of "0:02:02" out of a total time indicated by the execution time indicator 372 of "0:18:06", and the current time indicator 382 is shown at a proportional position along the total time range element 383. This position of the current time indicator 382 and the time of the current time display 384 correspond to the current state of progress through the current workpiece feature inspection plan, which relative to the editable plan representation 314 indicates that the workpiece feature 316F8 is being inspected after having completed the corresponding inspections of workpiece features 316F1-316F7. Correspondingly, relative to the editable plan representation 334, this indicates that the workpiece feature 336F8 is being inspected after having completed the corresponding inspections of workpiece features 336F1-336F7. In one implementation, the simulation animation control portion 390 may include elements that are usable to control an animated display of simulated progress through the current workpiece feature inspection plan as displayed in the 3D view. For example, a start element 391, stop element 393, reverse element 395 and loop element 396 are illustrated in the simulation animation control portion 390, although it will be appreciated that in other implementations other elements (e.g., corresponding to pause, reset, increase speed, decrease speed, etc.) may also be included.

As will be described in more detail below, the editable plan representation 314 that is illustrated in FIGS. 3-9 includes forty six workpiece features 316F1-316F46 on the workpiece 10' that may be inspected. The workpiece features 316F1-316F46 correspond to workpiece features 326F1-326F46 on the workpiece 10' in the workpiece inspection program simulation portion 322, and to workpiece features 336F1-336F46 in the editable plan representation 334. In order to simplify the figures, only some of the workpiece features are labeled. In the example of FIG. 3, the workpiece features 316F1-316F21 are currently visible in the plan view window 310, wherein a user may utilize controls to increment or scroll down (e.g., utilizing a vertical scroll bar 317, etc.) to view additional workpiece features (e.g., as will be illustrated and described in more detail below with respect to FIG. 7).

With respect to modifications to a workpiece feature inspection plan that may result from a user creating or defining auxiliary collision avoidance volumes, in one implementation the editing user interface portion 312 may include workpiece feature exclusion/inclusion elements 318 (e.g., checkboxes next to each of the workpiece features 316) that operate to indicate an exclusion state (e.g., with the associated box unchecked) or an inclusion state (e.g., with the associated box checked) for each associated workpiece feature 316. An exclusion state may correspond to an exclusion of the associated workpiece feature 316 from the set of workpiece features to be inspected, and an inclusion state may correspond to an inclusion of the associated workpiece feature 316 in the set of workpiece features to be inspected. As will be described in more detail below with respect to FIGS. 4-6, an exclusion state may result from an auxiliary collision avoidance volume preventing part or all of an associated workpiece feature 316 from being inspectable and/or may result from a user deselecting a workpiece feature (i.e., unchecking the box of the associated exclusion/inclusion element 318). In the example of FIG. 3, all of the workpiece features 316 have been selected for inclusion and none of the workpiece features 316 are currently indicated as not being inspectable due to an auxiliary collision avoidance volume.

Figure 4:
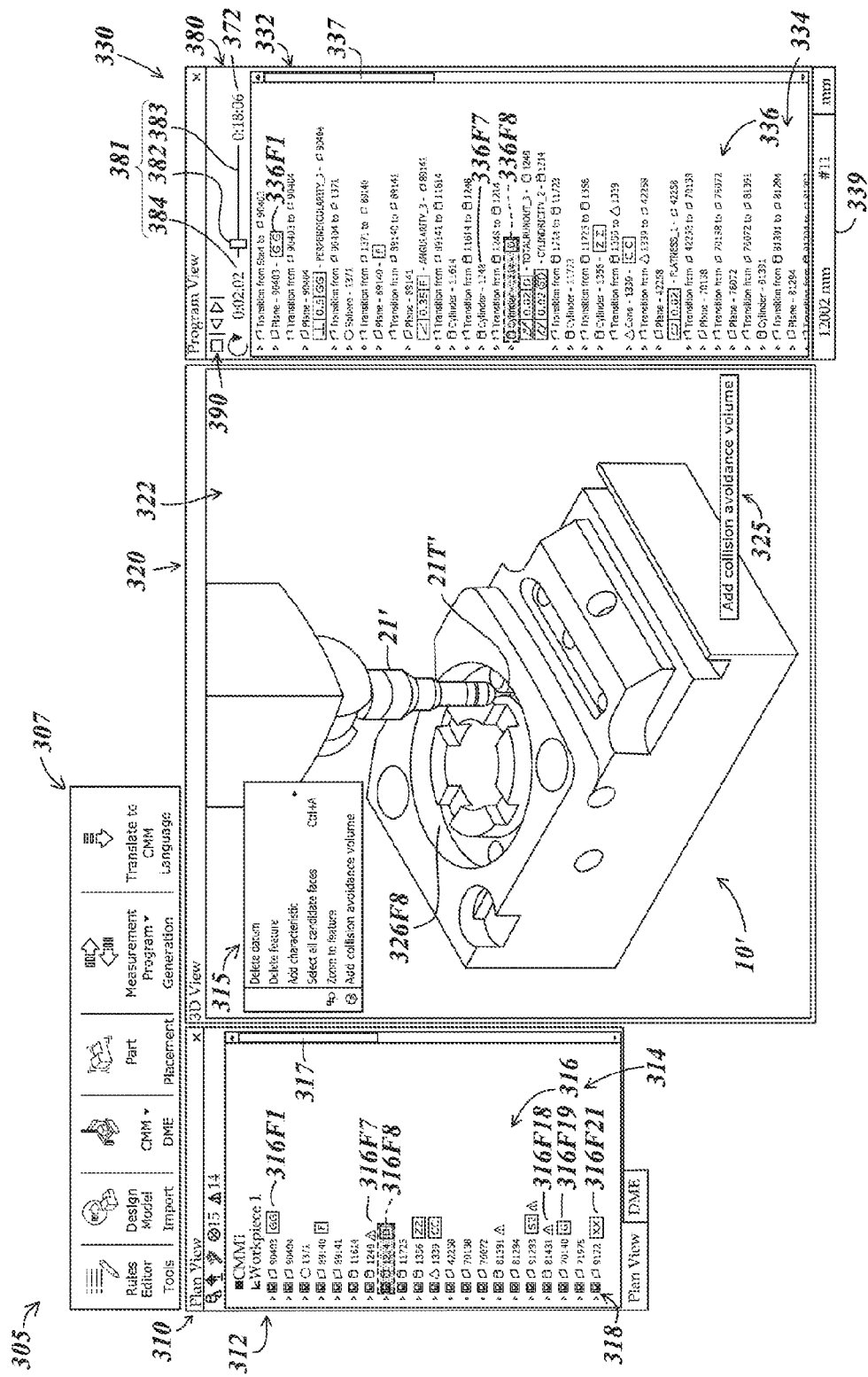
FIG. 4 is a diagram of a user interface illustrating auxiliary collision avoidance volume creation elements.

FIG. 4 is a diagram of the user interface 305 of FIG. 3 illustrating auxiliary collision avoidance volume creation elements. In the example of FIG. 4, a user may perform an action (e.g., performing a "right click" of a mouse with a selector within the plan view window 310 on one of the elements "CMM1", or "Workpiece1" which is surrounded by a highlight box to indicate that it is the target of the "right click" in FIG. 6) so as to cause a context menu window 315 to appear. The window 315 includes a menu with various selectable actions, including "delete datum", "delete feature", "add characteristic", "select all candidate faces", "zoom to feature" and "add collision avoidance volume". A user may select the "add collision avoidance volume" in order to create a new collision avoidance volume, as will be described in more detail below with respect to FIG. 5.

In addition, as further illustrated in the example of FIG. 4, a user may alternatively perform an action (e.g., performing a "right click" of a mouse with a selector within the 3D view window 320) so as to cause a context menu window 325 to appear. The window 325 provides an option for a user corresponding to a selection of "add collision avoidance volume". Similar to the selection in the window 315, a user may select the "add collision avoidance volume" in the window 325 in order to create a new collision avoidance volume, as will be described in more detail below with respect to FIG. 5.

Figure 5:
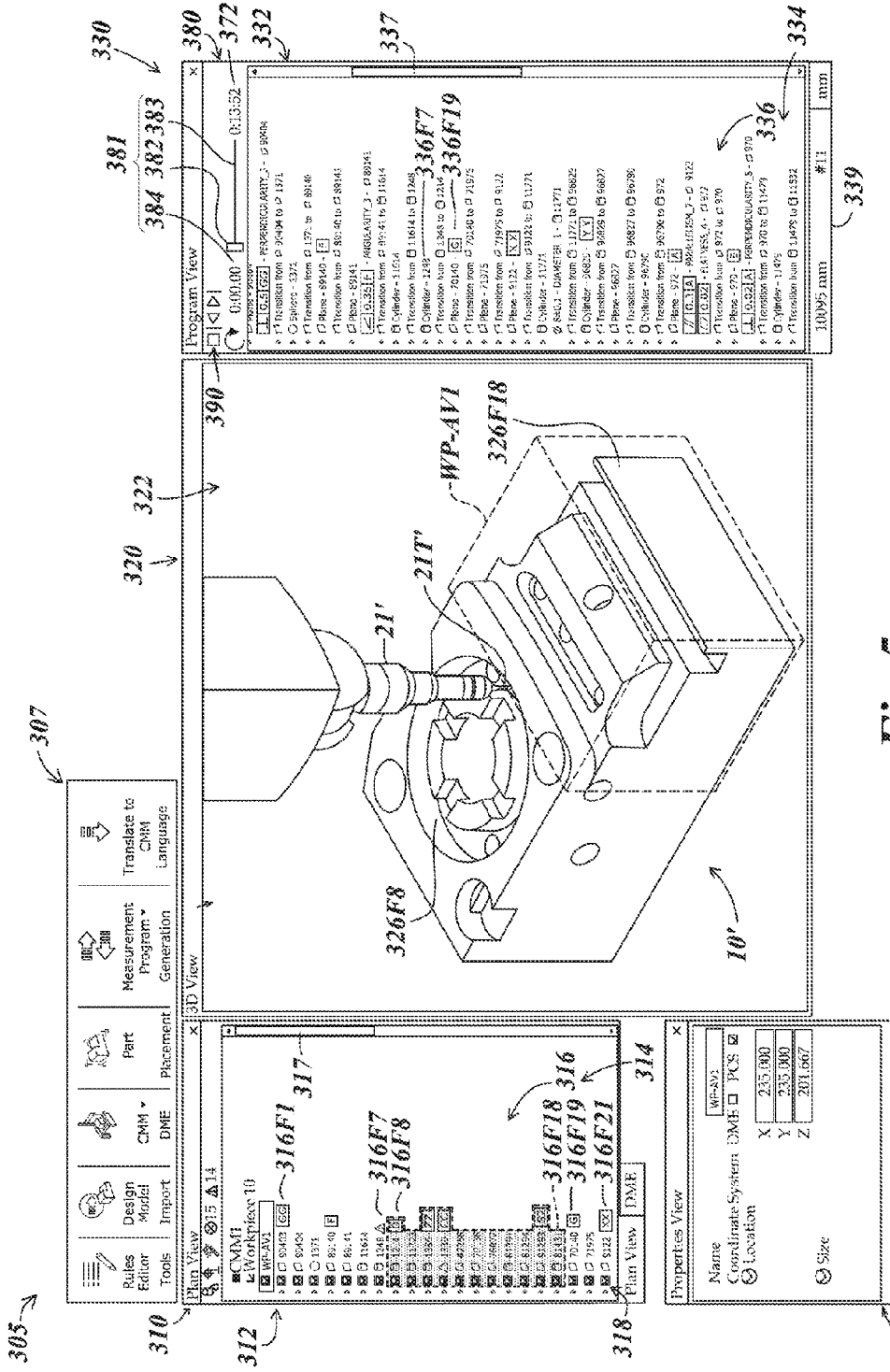
FIG. 5 is a diagram of a user interface illustrating an auxiliary collision avoidance volume as associated with a workpiece.

FIG. 5 is a diagram of the user interface 305 illustrating an auxiliary collision avoidance volume WP-AV1 as having been created and/or defined by a user and as being associated with the workpiece 10'. As described above with respect to FIGS. 2A and 2B, a user may wish to create or define an auxiliary collision avoidance volume that acts as a surrogate or substitute "avoidance zone" for CMM or workpiece fixturing that is presently undefined or unknown, in order to define a safely operable inspection program without requiring a user to define or draw such fixturing in a separate CAD program. For example, the auxiliary collision avoidance volume WP-AV1 may have been created or defined to act as a surrogate or substitute "avoidance zone" for somewhat unpredictable features on the workpiece 10' (e.g., unpredictably formed sprues or vents on a cast workpiece, unfinished areas on a machined workpiece, etc.). In such instances, the auxiliary collision avoidance volume WP-AV1 may allow other workpiece features on the workpiece 10' to be safely inspected by a program based on the finished workpiece CAD file, while it is still in process (e.g., with the sprues, vents and/or other unfinished areas still attached, etc.). In such a case, it may be desirable if the auxiliary collision avoidance volume is associated to move with the workpiece 10' (e.g., if the workpiece 10' is repositioned by a user on the stage of the CMM). In general, it will be appreciated that rather than requiring a user to model a physical object (e.g., such as unknown or complex sprues or vents or other features, elements or components) in a CAD file, the user may instead position an auxiliary collision avoidance volume so as to prevent potential collisions with the physical object.

As shown in FIG. 5, in the plan view window 310, the auxiliary collision avoidance volume WP-AV1 is indicated as a sub-element that is below and associated with the "Workpiece 10" (i.e., as corresponding to the workpiece 10' of the 3D view window 320), and is thus fixed with respect to the position of the workpiece. In one implementation, a type of exclusion/inclusion element (e.g., similar to the "checkboxes" of the exclusion/inclusion elements 318) may be associated with the auxiliary collision avoidance volume WP-AV1 (e.g., for having the auxiliary collision avoidance volume being included/active or excluded/inactive with respect to the current workpiece feature inspection plan, etc.) As illustrated in the example of FIG. 5, the exclusion/inclusion element that is associated with the auxiliary collision avoidance volume WP-AV1 is "checked", thus indicating that the auxiliary collision avoidance volume is in an included/active state with respect to the current workpiece feature inspection plan (that is, a motion path used in the inspection program will avoid the auxiliary collision avoidance volume WP-AV1, as opposed to ignoring it when "unchecked").

In the example of FIG. 5, the user interface 305 is also shown to include a properties view window 309. When an element (e.g., the auxiliary collision avoidance volume WP-AV1) is selected by a user (e.g. as indicated by the highlight box surrounding its label in the Plan View Window 310), the properties view window 309 may display and/or allow modifications to the properties for the selected element. For example, as illustrated in the properties view window 309, information may be provided regarding the "name", "coordinate system", "location" and "size" of the selected element. For the "coordinate system", checkboxes are provided for "DME" (i.e., corresponding to associating the location of the auxiliary collision avoidance volume WP-AV1 to be locked to the "dimensional measurement equipment" which corresponds to the CMM) or "PCS" (i.e., corresponding to associating the location of the auxiliary collision avoidance volume WP-AV1 to be locked to the "part coordinate system" which corresponds to being locked to the workpiece 10'). In the illustrated example, the checkbox is selected for the "PCS", thus indicating that the auxiliary collision avoidance volume WP-AV1 is associated with and moves with the workpiece 10'. The "location" indicates the location of reference point for the selected element (e.g., the lower left corner of the auxiliary collision avoidance volume WP-AV1), which in the illustrated example shows values of X=235, Y=235 and Z=201.667 in the corresponding value boxes. The "size" area may also include a selectable drop down menu which includes value boxes (not shown) for indicating the dimensions of the auxiliary collision avoidance volume WP-AV1.

In various implementations, the value boxes for the "location" and "size" of the auxiliary collision avoidance volume WP-AV1 may also function as types of auxiliary collision avoidance volume creation elements, and or modification elements, for allowing a user to create and/or define or modify an auxiliary collision avoidance volume. For example, by entering and/or changing the coordinates and/or size parameters in associated value boxes within the properties view window 309, a user may create and/or define and/or modify a location and/or a size for an auxiliary collision avoidance volume. Similarly, in various implementations a user may also or alternatively be able to manipulate graphical features within the workpiece inspection program simulation portion 322 of the 3D view window 320 for creating and/or defining an auxiliary collision avoidance volume. For example, in one exemplary modification mode, the auxiliary collision avoidance volume WP-AV1 in the 3D view window 320 may include various "handles" or other elements (e.g., on each side and/or corner) that a user may manipulate (e.g., by clicking on and dragging a particular side or corner) in order to alter the dimensions or position of the auxiliary collision avoidance volume WP-AV1. In such configurations, the adjustable elements may thus function as types of auxiliary collision avoidance volume creation elements or modification elements for allowing a user to create and/or define and/or modify an auxiliary collision avoidance volume.

In the example of FIG. 5, the auxiliary collision avoidance volume WP-AV1 has been created and/or defined such that it a motion path that avoids it will not allow the CMM (e.g. the touch probe) to reach any of the "enclosed" workpiece features 316F8-316F18. As a result, as illustrated in the plan view window 310, for each of the workpiece features 316F8-316F18, the corresponding workpiece feature exclusion/inclusion elements 318 have all automatically been unchecked. As a result, the workpiece features 316F8-316F18 are no longer included in the set of workpiece features to be inspected. This is illustrated in the editable plan representation 334, for which the workpiece feature 336F7 is shown to be followed by the workpiece feature 336F19, with the workpiece features 336F8-336F18 no longer being included. This may be contrasted with the state of the editable plan representation 334 illustrated in FIG. 3, for which the workpiece feature 336F7 is shown to be followed by the workpiece feature 336F8, etc. As a result of the unselecting of the workpiece features 316F8-316F18, in real time the exclusion time indicator 372 indicates a reduced time of "0:13:52", as compared to the previously indicated time of "0:18:06" of FIG. 3. This reduction in the displayed execution time indicates the estimated effect of the modifications caused by the auxiliary collision avoidance volume as it has been created and/or defined.

In various implementations, the workpiece features 316F8-316F18 that are affected by the auxiliary collision avoidance volume WP-AV1 may also or alternatively be indicated through highlighting or other mechanisms. For example, as illustrated in the plan view window 310, each of the workpiece features 316F8-316F18 is also highlighted. With respect to the 3D view window 320, in various implementations, the workpiece features 326F8-326F18 may also or alternatively be highlighted or otherwise marked. In order to simplify the illustrations in FIG. 3, only the workpiece features 326F8 and 326F18 are labeled in the 3D view window 320. In various implementations, the auxiliary collision avoidance volume WP-AV1 may be represented as being transparent in the 3D view window 320, so as to allow other elements that are within or behind the auxiliary collision avoidance volume WP-AV1 to be visible.

In various implementations, different colors, markers, icons, etc. may be utilized to indicate different types of information regarding workpiece features in the plan view window 310, the 3D view window 320 and/or the program view window 330 (e.g., indicating workpiece features for which no inspection may be performed versus ones for which a partial inspection may still be performed, etc.) As an example, as shown in the 3D view window 320, the auxiliary collision avoidance volume WP-AV1 is indicated as only covering part of the edge of the workpiece feature 326F8, for which the rest of the workpiece feature 326F8 may still be inspectable. In such an instance, in one specific example implementation, the system may be configured to allow a user to "re-check" the corresponding workpiece feature exclusion/inclusion element 318 for the workpiece feature 326F8, with a corresponding indication that only a partial inspection may be able to be performed due to the auxiliary collision avoidance volume WP-AV1. In some instances, when an auxiliary collision avoidance volume prevents any inspection of a workpiece feature from being performed, the system may correspondingly prevent a corresponding workpiece feature exclusion/inclusion element 318 from being "re-checked", so as to provide an indication to the user that no part of the particular workpiece feature can be inspected due to the auxiliary collision avoidance volume. As noted above, such indications may also or alternatively be provided by other mechanisms (e.g., utilizing different colors, markers, icons, etc. with respect to the associated workpiece features). As will be described in more detail below with respect to FIG. 7, when a workpiece feature is only able to be partially inspected due to a presence of one or more auxiliary collision avoidance volumes, an inspection path may be illustrated that covers only the inspectable areas of the workpiece feature.

Figure 6:
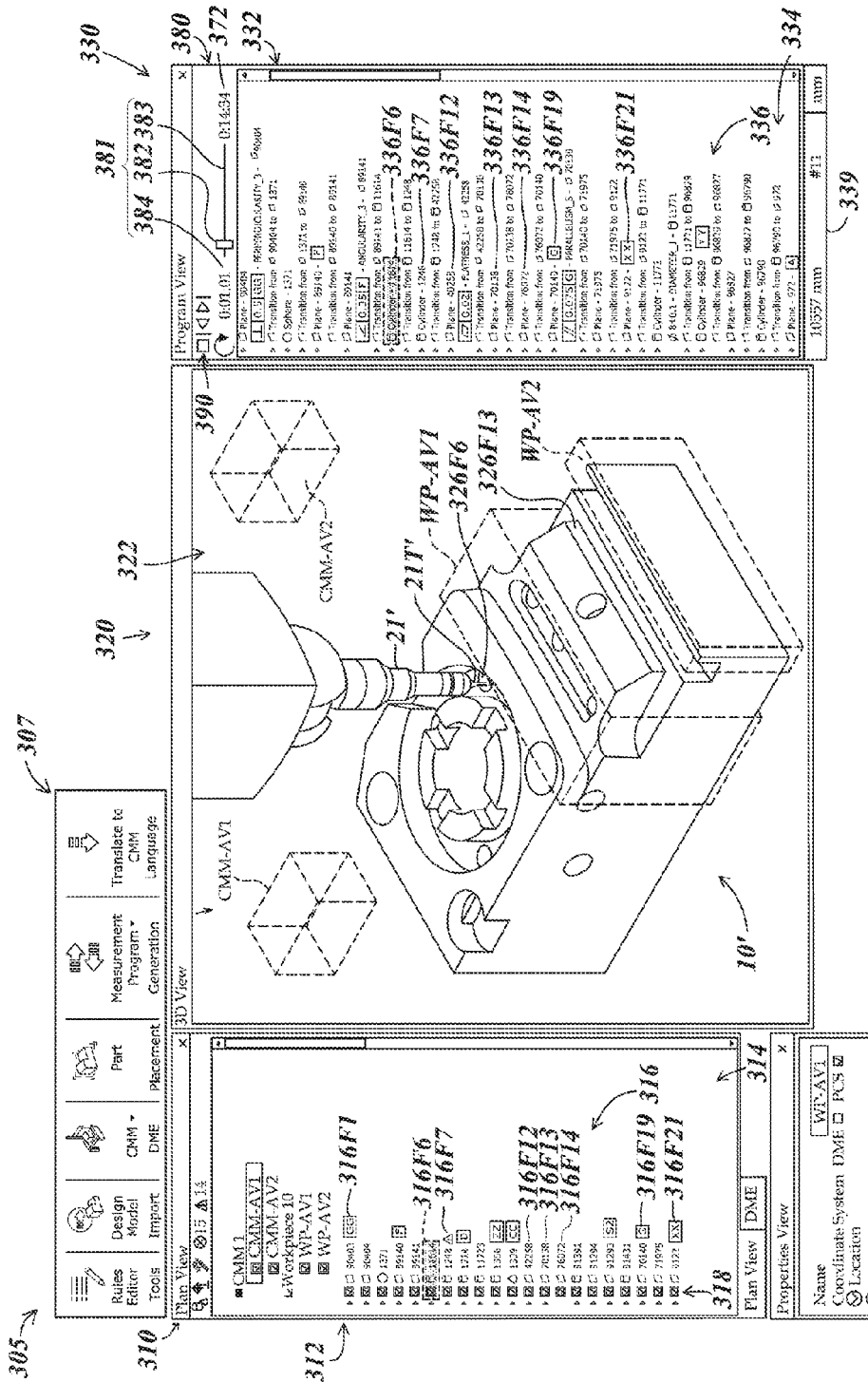
FIG. 6 is a diagram of a user interface illustrating two auxiliary collision avoidance volumes as associated with a workpiece and two auxiliary collision avoidance volumes as associated with a CMM.

FIG. 6 is a diagram of the user interface 305 illustrating two auxiliary collision avoidance volumes WP-AV1 and WP-AV2 as associated with the workpiece 10' and two auxiliary collision avoidance volumes CMM-AV1 and CMM-AV2 as associated with the CMM. In the plan view window 310, the auxiliary collision avoidance volumes WP-AV1 and WP-AV2 are indicated as sub-elements that are associated with the "Workpiece 10" (i.e., as corresponding to the workpiece 10' of the 3D view window 320) and are thus fixed with respect to the position of the workpiece. The auxiliary collision avoidance volumes CMM-AV1 and CMM-AV2 are indicated as sub-elements that are associated with the "CMM 1" (i.e., as corresponding to the current CMM configuration), and are thus fixed with respect to the position of the CMM. As described above with respect to FIG. 5, in various implementations a type of exclusion/inclusion element (e.g., similar to the "checkboxes" of the exclusion/inclusion elements 318) may be associated with each of the auxiliary collision avoidance volumes WP-AV1, WP-AV2, CMM-AV1 and CMM-AV2 (e.g., for having each of the auxiliary collision avoidance volumes being either included/active or excluded/inactive with respect to the current workpiece feature inspection plan, etc.) As illustrated in the example of FIG. 6, each of the exclusion/inclusion elements associated with each of the auxiliary collision avoidance volumes WP-AV1, WP-AV2, CMM-AV1 and CMM-AV2 is "checked", thus indicating that all of the auxiliary collision avoidance volumes are in an included/active state with respect to the current workpiece feature inspection plan.

As described above with respect to FIGS. 2A and 2B, auxiliary collision avoidance volumes that are associated with a CMM (e.g., auxiliary collision avoidance volumes CMM-AV1 and CMM-AV2) may be created and/or defined for various reasons. For example, such collision avoidance volumes may be created with respect to an area where certain CMM components may be located, such as changing racks for probes or other equipment, or to reserve an area on the CMM stage where a user may wish to store items, etc. Examples of such CMM components and associated auxiliary collision avoidance volumes will be described in more detail below with respect to FIG. 10.

As illustrated in the 3D view window 320, the auxiliary collision avoidance volume WP-AV1 has been resized with respect to the version illustrated in FIG. 5. More specifically, in the illustrated version in FIG. 6, a user has utilized one or more auxiliary collision avoidance volume creation elements to define the auxiliary collision avoidance volume WP-AV1 to have the smaller illustrated size. As described above with respect to FIG. 5, the various auxiliary collision avoidance volume creation elements that may be utilized by a user for defining the size and/or location of an auxiliary collision avoidance volume may be included in the properties view window 309, the 3D view window 320 and/or other areas of the user interface 305. For example, to change a size of an existing auxiliary collision avoidance volume, a user may make or change entries for the size parameters in associated value boxes within the properties view window 309 and/or may manipulate graphical features of the auxiliary collision avoidance volume within the workpiece inspection program simulation portion 322 of the 3D view window 320, etc.

In the example of FIG. 6, in addition to the resizing of the auxiliary collision avoidance volume WP-AV1, the new auxiliary collision avoidance volume WP-AV2 has also been created as associated with the workpiece 10' (e.g., to prevent collisions with certain features such as vents, sprues, etc. on the associated section of the workpiece 10'). The process for creating and/or defining the auxiliary collision avoidance volume WP-AV2 may be similar to that described above with respect to FIG. 4. More specifically, a user may perform certain actions (e.g., a "right click" in the plan view window, 3D view window 320, or other area of the user interface 305) so as to make one of the windows 315 or 325 appear for creating a new auxiliary collision avoidance volume. Once created, the auxiliary collision avoidance volume WP-AV2 may further be defined in terms of size and/or position (e.g., utilizing the techniques described above with respect to the properties view window 309 and/or manipulation of the graphical features within the 3D view window 320, etc.).

In the example of FIG. 6, the resizing of the auxiliary collision avoidance volume WP-AV1 and the positioning of the new auxiliary collision avoidance volume WP-AV2 has resulted in different workpiece features being inspectable than those described above with respect to FIG. 5. More specifically, as shown in FIG. 6, the auxiliary collision avoidance volume WP-AV1 has been defined so as to prevent partial or full inspection of each of the workpiece features 316F8-316F11, while the auxiliary collision avoidance volume WP-AV2 has been created and/or defined so as to prevent partial or full inspection of each of the workpiece features 316F15-316F18. As a result, as illustrated in the plan view window 310, for each of the workpiece features 316F8-316F11 and 316F15-316F18, the corresponding workpiece feature exclusion/inclusion elements 318 have remained unchecked (i.e., similar to the condition illustrated in FIG. 5). However, as also illustrated in FIG. 6, due to a spacing between the auxiliary collision avoidance volumes WP-AV1 and WP-AV2 (e.g., as illustrated in the 3D view window 320), certain workpiece features (e.g., workpiece features 316F12-316F14) which previously could not be inspected in the configuration of FIG. 5, are now inspectable again in the configuration of FIG. 6. The differences between FIGS. 5 and 6 illustrate one example of how a user may resize and/or create new auxiliary collision avoidance volumes to more specifically target particular elements (e.g., vents, sprues, etc. on associated sections of a workpiece), so as to allow other workpiece features to continue to be inspected (e.g., the workpiece features 316F12-316F14).

As a result of the spacing between the auxiliary collision avoidance volumes WP-AV1 and WP-AV2, as shown in FIG. 6 the workpiece features 316F12-316F14 are shown as having their corresponding workpiece feature exclusion/inclusion elements 318 automatically rechecked so as to be reselected for inclusion in the set of workpiece features to be inspected. As a result, as illustrated in the editable plan representation 334, the workpiece feature 336F7 is now followed by the workpiece features 336F12-336F14, which are subsequently followed by the workpiece feature 336F19, etc. As a result of this modification, the execution time indicator 372 is shown to indicate a time of "0:14:34", which is an increase from the indicated time of "0:13:52" of FIG. 5, as corresponding to the additional time required for inspecting the workpiece features 336F12-336F14 as re-included in the set of workpiece features to be inspected.

As also illustrated in FIG. 6, a cylinder workpiece feature is highlighted, as corresponding to the workpiece feature 316F6 of the editable plan representation 314, the workpiece feature 326F6 of the 3D view window 320 and the workpiece feature 336F6 of the editable plan representation 334. The current time display 384 is shown to correspondingly indicate a time of "0:01:01" out of a total time indicated by the execution time indicator 372 of "0:14:34", and the current time indicator 382 is shown to be at a proportional position along the graphical total time range element 383. This indicates that the inspection of the workpiece feature 326F6 occurs approximately at the time "0:01:01" after the inspection of the workpiece features 326F1-326F5 has been completed.

In various implementations, as an alternative or in addition to the workpiece feature exclusion/inclusion elements 318 described above with respect to FIGS. 3-6, additional elements and/or commands may be provided. For example, the editing user interface portion 312 or 332 may include a delete command usable to delete a currently selected workpiece feature 316 or 336 from the set of workpiece features to be inspected. In such an implementation, the first set of editing operations may include a utilization of the delete command, and the execution time indicator 372 may automatically be updated in response to a utilization of the delete command. As another example, the editing user interface portion 312 or 332 may include an undo command usable to undo a previously executed operation. In such an implementation, the first set of editing operations may include a utilization of the undo command to undo a previously executed operation included in the first set of editing operations, and the execution time indicator 372 may automatically be updated in response to a utilization of the undo command.

Figure 7:
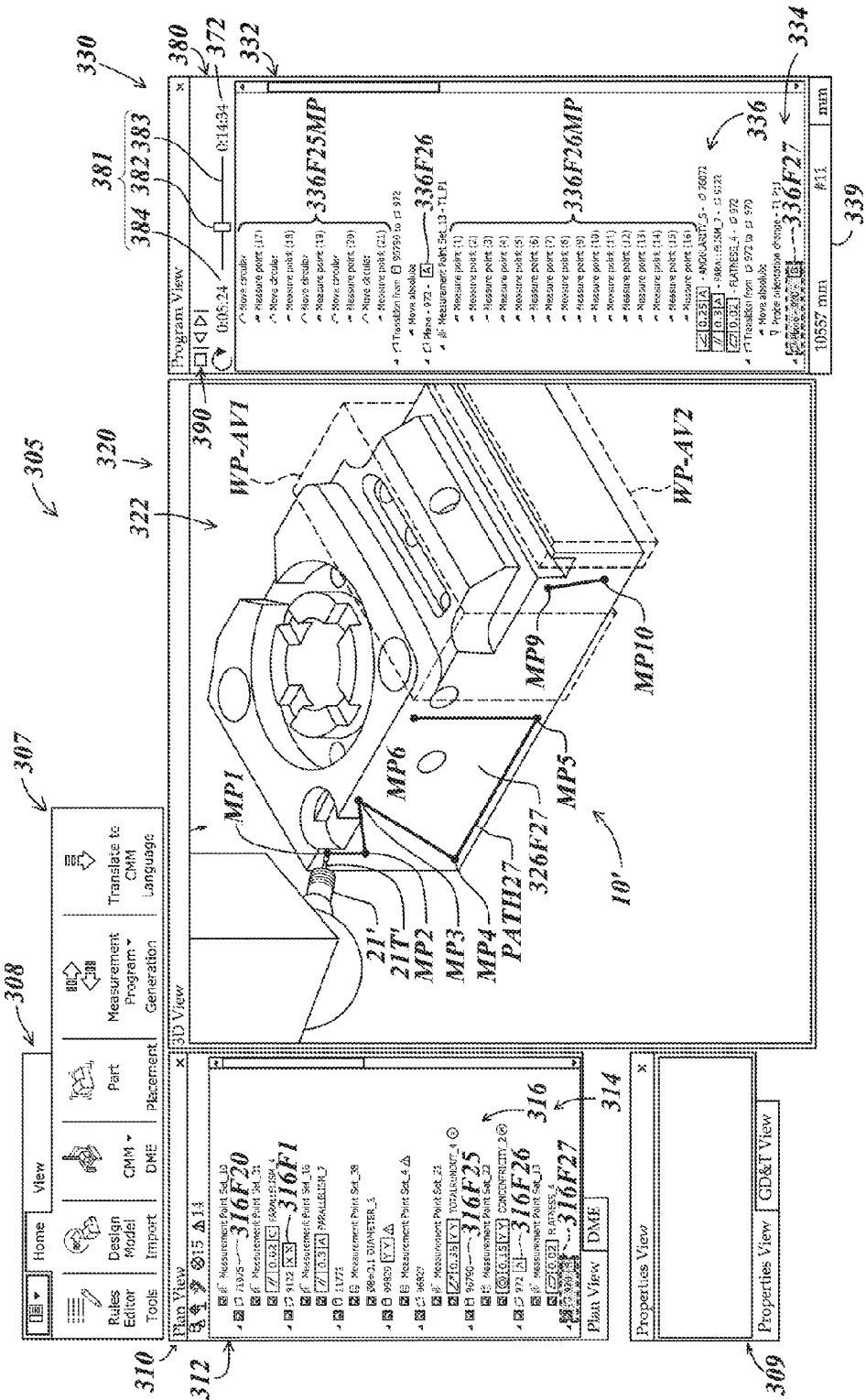
FIG. 7 is a diagram of a user interface in which additional detail is displayed regarding the editable plan representation and an example inspection path is shown as avoiding auxiliary collision avoidance volumes.

FIG. 7 is a diagram of a user interface in which additional detail is displayed regarding the editable plan representations 314 and 334 and an example inspection path PATH27 is shown as avoiding the auxiliary collision avoidance volumes WP-AV1 and WP-AV2. As shown in FIG. 7, the additional detail for the editable plan representations 314 and 334 includes information about specific measurement points, movements, angles, etc. for the performance of the inspections of the designated workpiece features. For example, in the editable plan representation 334, a set of sixteen measurement points 336F26MP is illustrated with respect to the inspection of the workpiece feature 336F26.

As shown in FIG. 7, an example plane workpiece feature has been highlighted. As illustrated, the plane workpiece feature corresponds to the workpiece feature 316F27 in the editable plan representation 314, the workpiece feature 326F27 in the 3D view window 320, and the workpiece feature 336F27 in the editable plan representation 334. In the 3D view window 320, the probe 21' and stylus 21T' are illustrated as positioned for beginning the inspection of the plane workpiece feature 326F27. The current time display 384 is shown to correspondingly indicate a time of "0:05:24" out of a total time indicated by the execution time indicator 372 of "0:14:34", and the current time indicator 382 is shown at a proportional position along the graphical total time range element 383. This indicates that the inspec-tion of the workpiece feature 336F27 occurs approximately at the time "0:05:24", after the inspection of the previous workpiece features has been completed.

In various implementations, the corresponding measurement points or other inspection elements for a highlighted workpiece feature 326 may be illustrated relative to the workpiece feature in the 3D view window 320. For example, with respect to the highlighted workpiece feature 326F27, sections of a measurement path PATH27 are shown as connecting corresponding measurement points MP1-MP6 and MP9-MP10. As illustrated, the measurement path PATH27 avoids the auxiliary collision avoidance volumes WP-AV1 and WP-AV2, and no measurement points that are included in the current workpiece feature inspection plan are within either of the auxiliary collision avoidance volumes WP-AV1 and WP-AV2. In various implementations, certain measurement points that may have previously been included in a workpiece feature inspection plan (e.g., measurement points MP7 and MP8 (not shown)) may be excluded due to a location of an auxiliary collision avoidance volume (e.g., the auxiliary collision avoidance volume WP-AV1) preventing the inspection of the particular measurement points.

Figure 8:
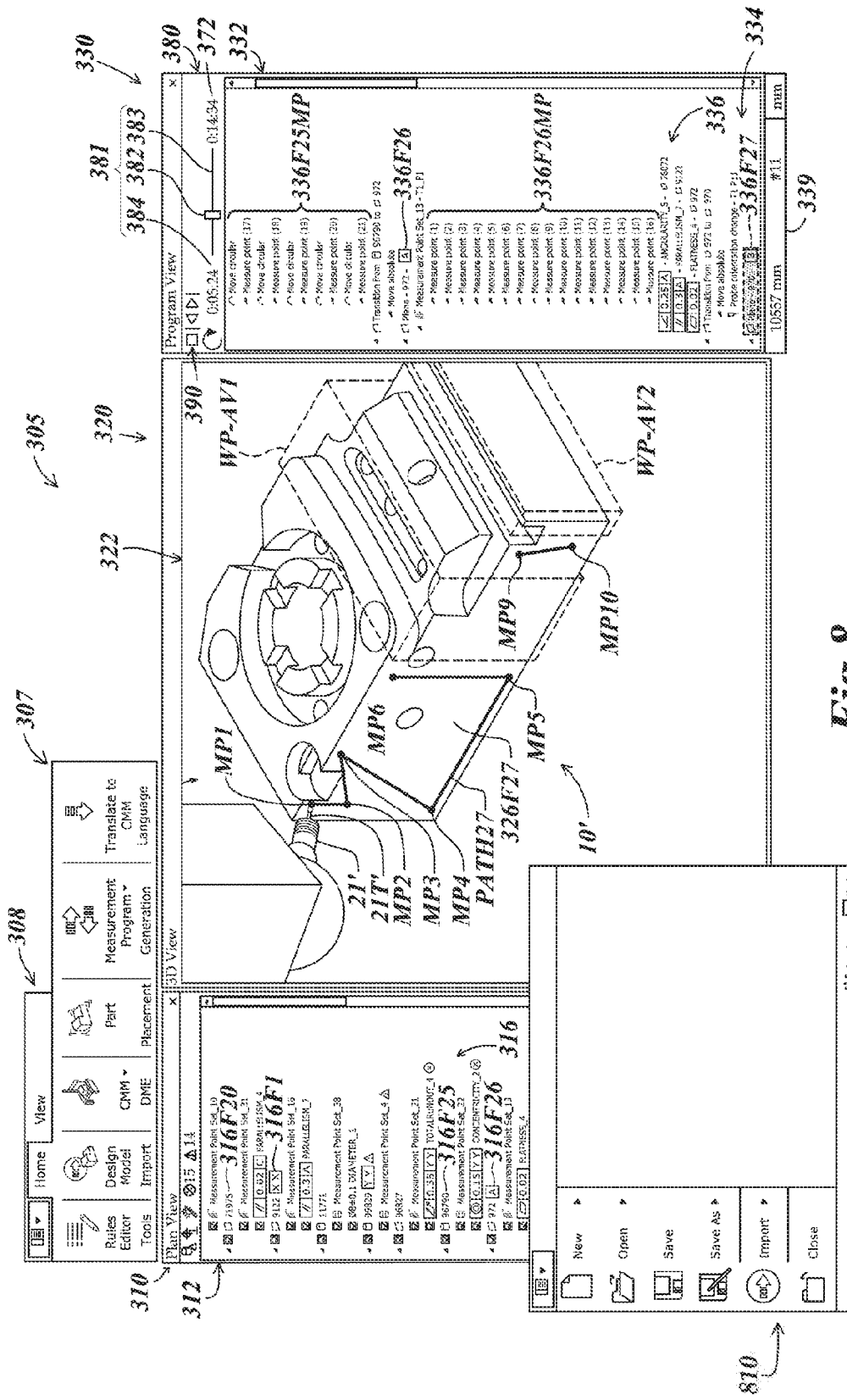
FIG. 8 is a diagram of the user interface of FIG. 7 in which a window has been provided that includes different options that may be selected by a user with respect to a project file.

FIG. 8 is a diagram of the user interface 305 of FIG. 7 in which a window 810 has been provided that includes different options that may be selected by a user with respect to a project file. For example, the different illustrated options include selections for "new", "open", "save", "save as", "import" or "close" with respect to a project file. In various implementations, the window 810 may be provided in response to a user action within the user interface 305. For example, at the left side of a selection bar 308 (e.g., above the menu bar 307), a "list" icon may be provided that is selectable by a user in order to cause the window 810 to be displayed. As will be described in more detail below with respect to FIG. 9, a user may choose either of the selections for "save" or "save as" for saving a project file.

Figure 9:
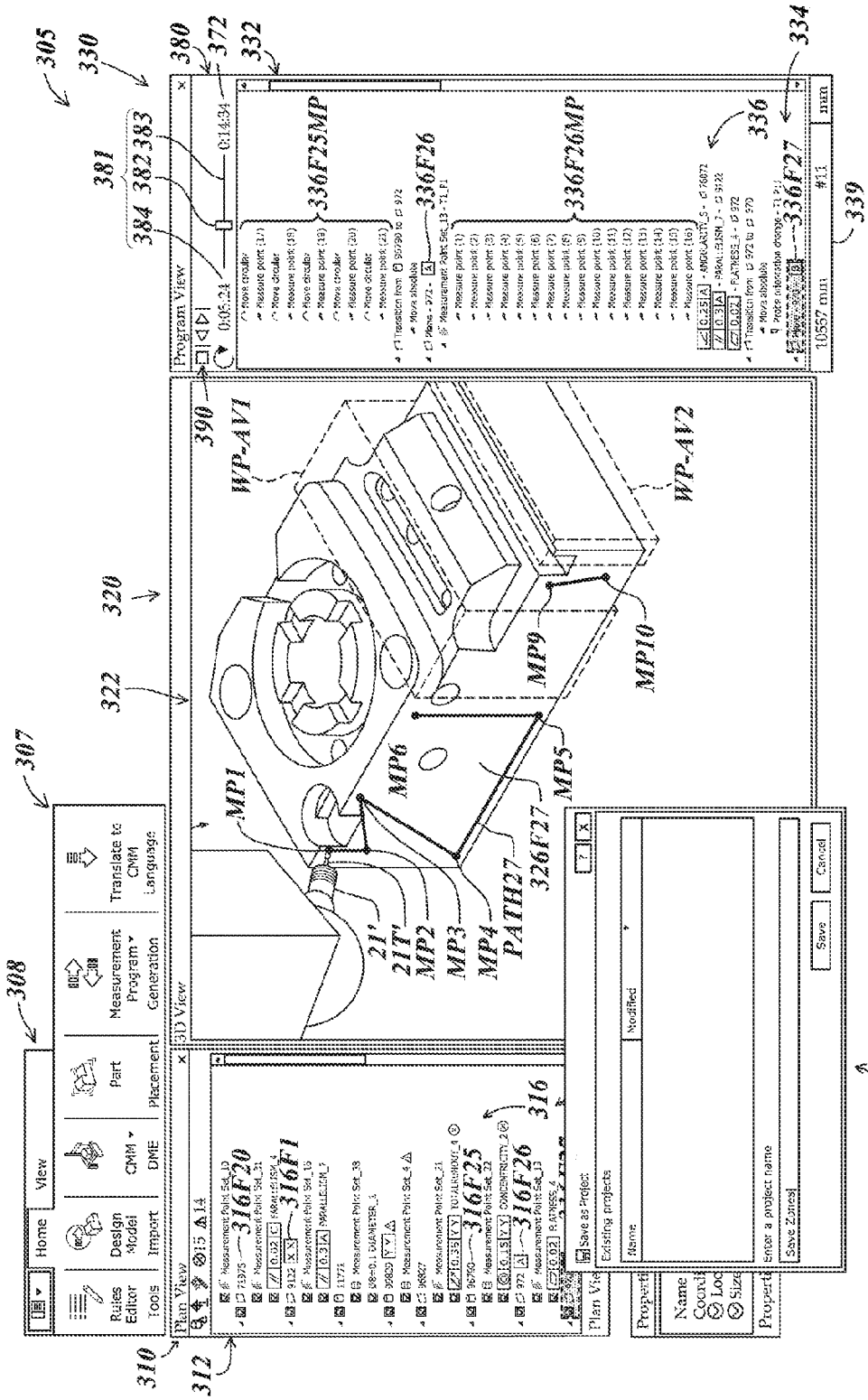
FIG. 9 is a diagram of the user interface of FIG. 8 in which a window has been provided as corresponding to a user selection for saving a project file.
Figure 10:
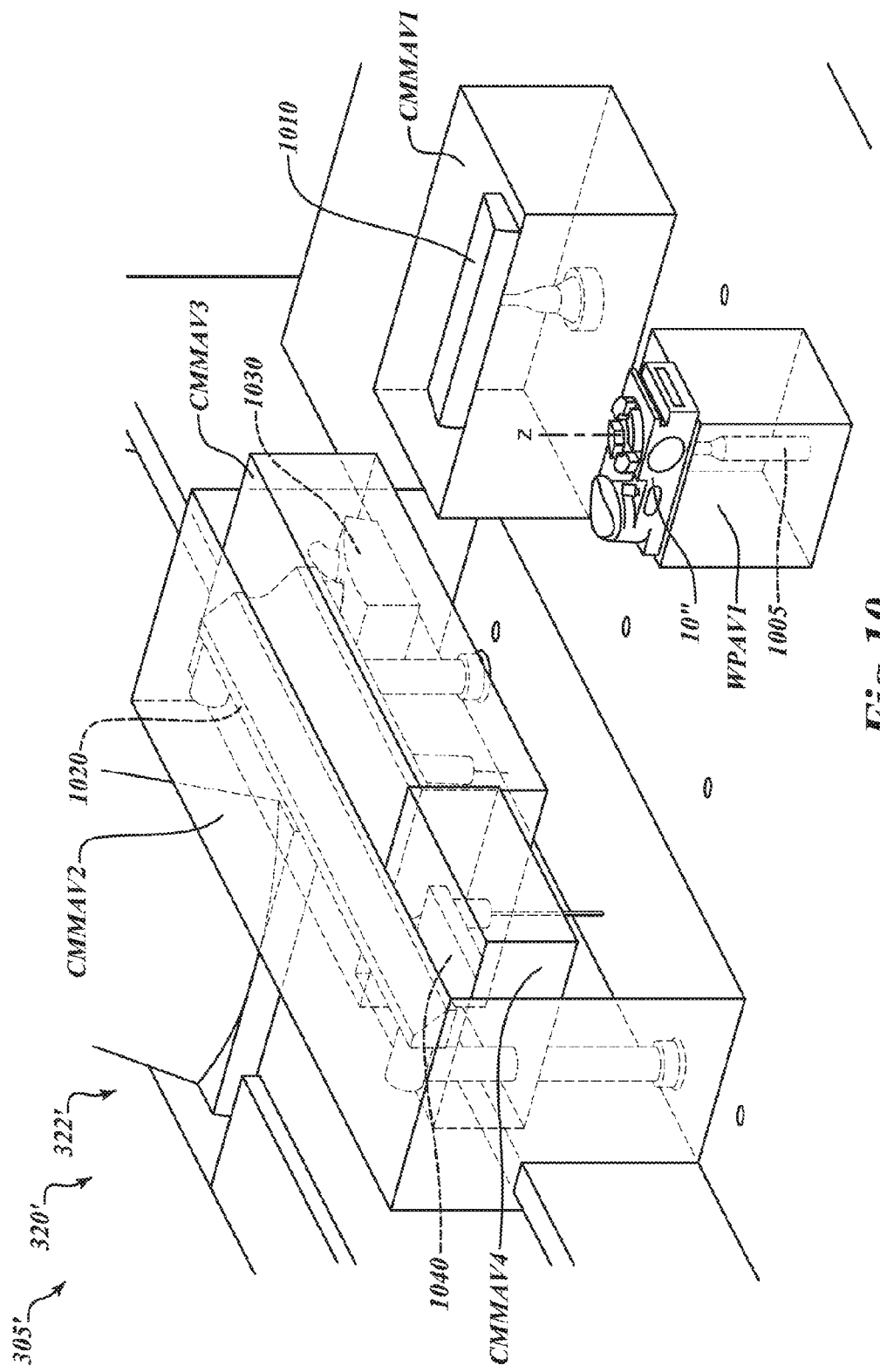
FIG. 10 is a diagram of a portion of a user interface illustrating additional examples of auxiliary collision avoidance volumes.

FIG. 9 is a diagram of the user interface 305 of FIG. 8 in which a window 910 has been provided as corresponding to a user selection for saving a project file. The window 910 includes an area for listing "existing projects" (i.e., and the corresponding "name" and "modified" information for the project files), as well as an area to "enter a project name" and selection buttons for "save" and "cancel". The "existing projects" area is blank in the illustrated example due to no project files having previously been saved. In the "enter project name" area, a user has input "Save Zones" as the name of the current project file to be saved, after which the user may click the "save" button to save the project file. As described above with respect to FIGS. 2A and 2B, in various implementations as part of the saving of the project file(s), the auxiliary collision avoidance volumes WP-AV1 and WP-AV2 may be saved as separate from the CMM and/or workpiece CAD files, or as part of such files or other files, etc.

FIG. 10 is a diagram of a portion of a user interface 305' illustrating additional examples of auxiliary collision avoidance volumes as associated with either a workpiece or a CMM. The illustrated portion of the user interface 305' includes a 3D view window 320' with a workpiece inspection program simulation portion 322'. As illustrated in FIG. 10, a workpiece 10" is supported above the CMM stage by a cylindrical support member 1005, and various CMM components 1010, 1020, 1030 and 1040 (e.g., corresponding to changing racks for probes or probe tips, or other physical components, etc.) are also illustrated at various locations on the CMM stage. An auxiliary collision avoidance volume WPAV1 (e.g., as corresponding to the cylindrical support member 1005) is illustrated as associated with the workpiece 10", and four auxiliary collision avoidance volumes CMMAV1-CMMAV4 (e.g., as corresponding to the CMM components 1010-1040) are illustrated as associated with the CMM. As described above with respect to FIGS. 2A and 2B, in various implementations the auxiliary collision avoidance volumes WPAV1 and CMMAV1-CMMAV4 may be utilized so that a user does not have to create CAD models of the corresponding physical components (e.g., the cylindrical support member 1005 or the components 1010-1040). More specifically, while for purposes of illustration the cylindrical support member 1005 and the components 1010-1040 have been included on the stage, during actual operation of the system there may be no CAD models for such components, in which case the corresponding auxiliary collision avoidance volumes may appear to be empty, as will be described in more detail below with respect to FIG. 11.

Figure 11:
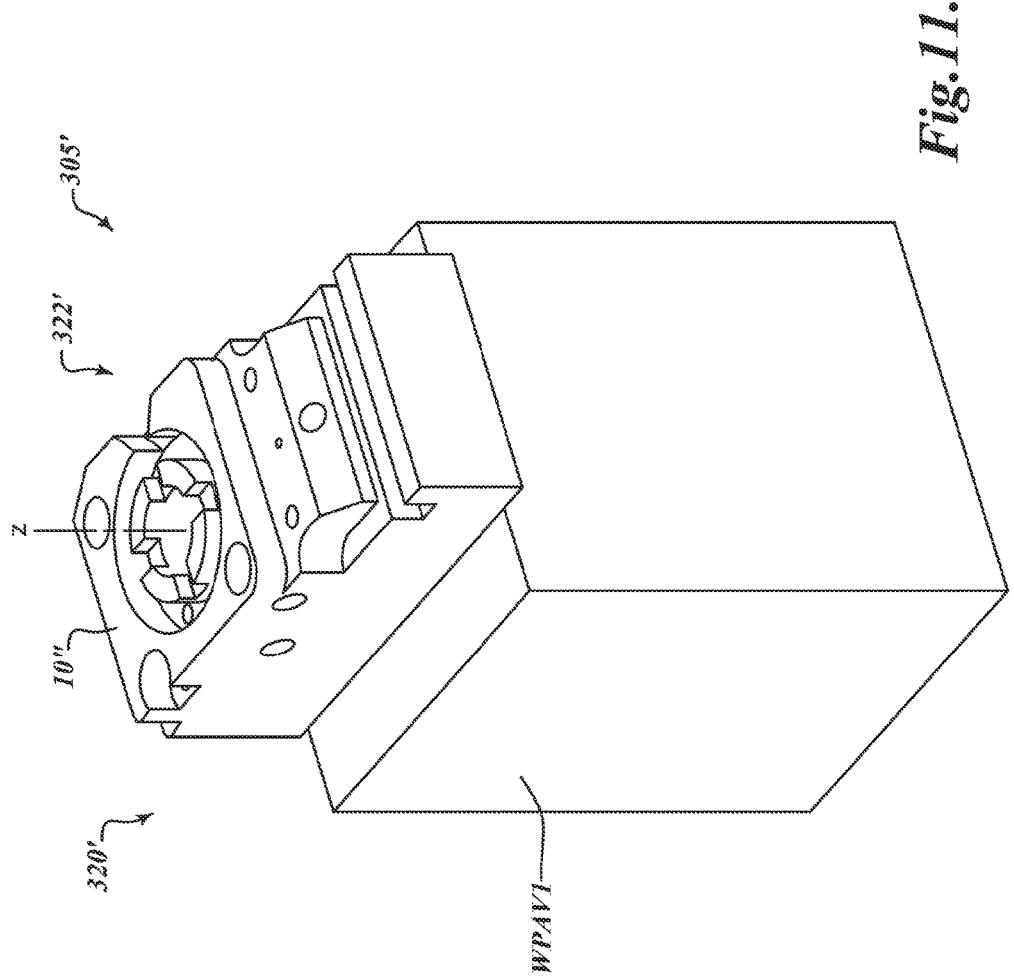
FIG. 11 is a diagram of a portion of the user interface of FIG. 10 illustrating one of the example auxiliary collision avoidance volumes as associated with a workpiece.

FIG. 11 is a diagram of a portion of the user interface 305' of FIG. 10 illustrating the example auxiliary collision avoidance volume WPAV1 as associated with the workpiece 10". In the example of FIG. 11, the cylindrical support member 1005 of FIG. 10 is not illustrated, and the workpiece 10" is simply shown on top of the empty auxiliary collision avoidance volume WPAV1. As described above with respect to FIGS. 2A and 2B, this illustration is consistent with the concept that the auxiliary collision avoidance volume WPAV1 may be utilized at a location where a physical object (e.g., the cylindrical support member 1005) is expected to be, so as to prevent collisions that could otherwise occur with the physical object. By utilizing auxiliary collision avoidance volumes in this manner, a user is not required to create a CAD model for certain types of physical objects that may be complex or for which the dimensions may not be known, etc. As another example, a user may be aware that the workpiece 10" will be supported at a certain height above the stage of the CMM, but may be uncertain as to the exact shape or dimensions of the support member (e.g., the user may be uncertain if the cylindrical support member 1005 will be used, or if a different support member such as a block or other shaped object for supporting the workpiece 10" may be used, etc.). In such a case, the user may create and/or define the auxiliary collision avoidance volume WPAV1 so as to prevent collisions with any of the various different types of support members that may be utilized without having to create a CAD model for any of the different types of support members.

Figure 12:
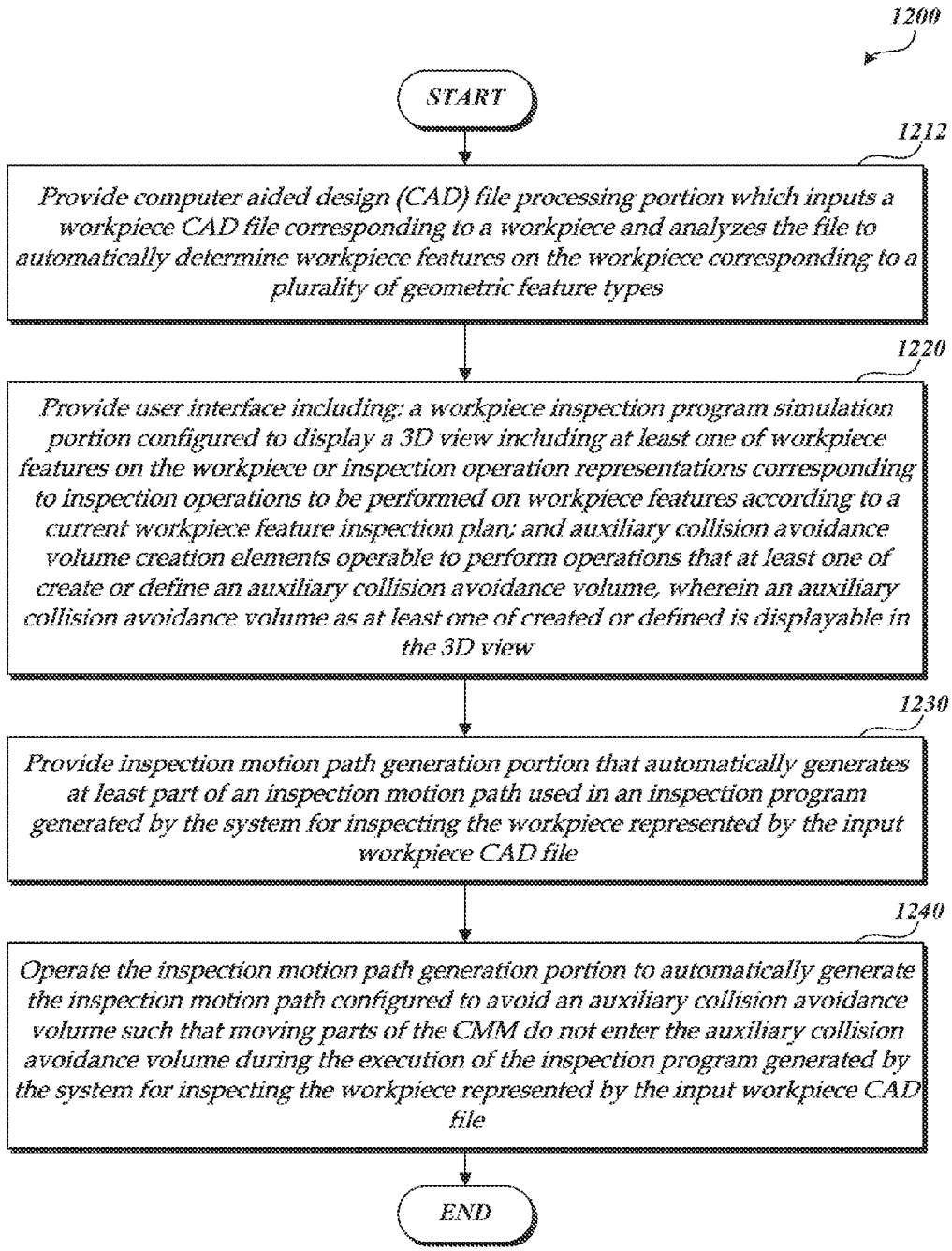
FIG. 12 is a flow diagram illustrating one exemplary implementation of a routine for providing a user interface including auxiliary collision avoidance volume creation elements.

FIG. 12 is a flow diagram illustrating one exemplary implementation of a routine 1200 for providing a user interface including auxiliary collision avoidance volume creation elements. At a block 1212, a computer aided design (CAD) file processing portion is provided which inputs a workpiece CAD file corresponding to a workpiece and analyzes the file to automatically determine workpiece features on the workpiece corresponding to a plurality of geometric feature types. At a block 1220, a user interface is provided including a workpiece inspection program simulation portion and auxiliary collision avoidance volume creation elements. The workpiece inspection program simulation portion is configured to display a 3D view including at least one of workpiece features on the workpiece or inspection operation representations corresponding to inspection operations to be performed on workpiece features according to a current workpiece feature inspection plan. The auxiliary collision avoidance volume creation elements are operable to perform operations that at least one of create or define an auxiliary collision avoidance volume that is displayable in the 3D view. In various implementations, the auxiliary collision avoidance volume creation elements are operable within the context of the user interface of the system for programming workpiece feature inspection operations, and is not operable to modify the physical features of the workpiece represented in the input workpiece CAD file.

At a block 1230, an inspection motion path generation portion is provided that automatically generates at least part of an inspection motion path used in an inspection program generated by the system for inspecting the workpiece represented by the input workpiece CAD file. At a block 1240, the inspection motion path generation portion is operated to automatically generate the inspection motion path. In various implementations, the inspection motion path is configured to avoid an auxiliary collision avoidance volume such that moving parts of the CMM do not enter the auxiliary collision avoidance volume during the execution of the inspection program generated by the system for inspecting the workpiece represented by the input workpiece CAD file.

Figure 13:
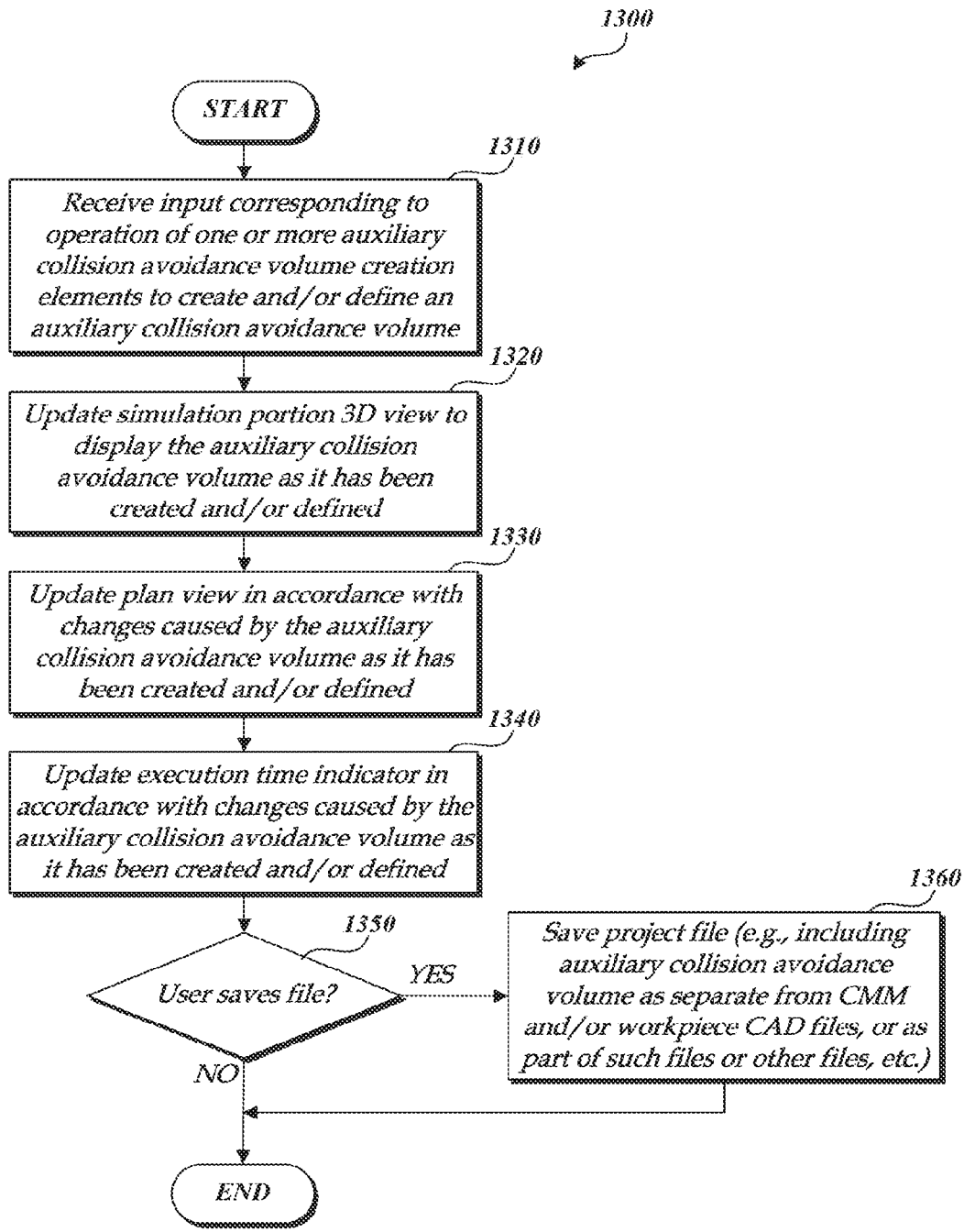
FIG. 13 is a flow diagram illustrating one exemplary implementation of a routine for updating a 3D view, plan view and execution time indicator in accordance with changes caused by an auxiliary collision avoidance volume and for saving a project file.

FIG. 13 is a flow diagram illustrating one exemplary implementation of a routine 1300 for updating a 3D view, plan view and execution time indicator in accordance with changes caused by an auxiliary collision avoidance volume. At a block 1310, input is received (e.g., from a user) corresponding to operation of one or more auxiliary collision avoidance volume creation elements to create and/or define an auxiliary collision avoidance volume. At a block 1320, a 3D view is updated to display the auxiliary collision avoidance volume as it has been created and/or defined. At a block 1330, a plan view is updated in accordance with changes caused by the auxiliary collision avoidance volume as it has been created and/or defined. At a block 1340, an execution time indicator is updated in accordance with changes caused by the auxiliary collision avoidance volume as it has been created and/or defined.

At a decision block 1350, a determination is made as to whether a user has made a selection for saving a project file. If no project file is to be saved, then the routine ends, and if a project file is to be saved, then the routine proceeds to a block 1360. At the block 1360, the project file is saved (e.g., including the auxiliary collision avoidance volume as separate from CMM and/or workpiece CAD files, or as part of such files or other files, etc.)

Figure 14:
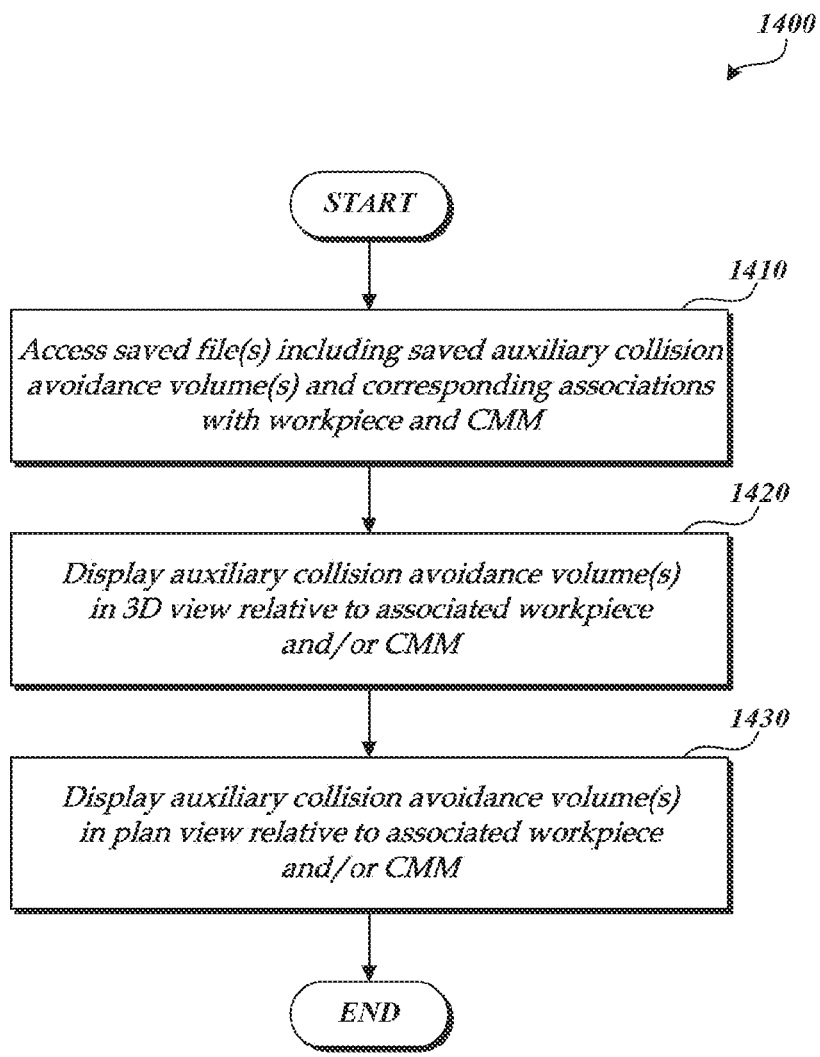
FIG. 14 is a flow diagram illustrating one exemplary implementation of a routine for accessing a saved project file including an auxiliary collision avoidance volume.

FIG. 14 is a flow diagram illustrating one exemplary implementation of a routine 1400 for accessing a project file including one or more saved auxiliary collision avoidance volumes. At a block 1410, the saved file(s) are accessed, including the saved auxiliary collision avoidance volume(s) and the corresponding associations with a workpiece and a CMM. At a block 1420, the auxiliary collision avoidance volume(s) are displayed in the 3D view relative to the associated workpiece and/or CMM. At a block 1430, the auxiliary collision avoidance volume(s) are displayed in the plan view relative to the associated workpiece and/or CMM.

FIGS. 15-20 illustrate various aspects of one implementation of a 3D collision avoidance volume and/or its 3D collision avoidance volume representation that include integrated graphical modification properties. In particular, in contrast to the conventional methods of editing or modifying a 3D collision avoidance volume as outlined above with reference to FIGS. 4 and 5, the methods of editing or modifying a 3D collision avoidance volume described with reference to FIG. 15-20 do not require the explicit operation of a separate button to display an editing mode or properties window or shape editing handles or the like. Rather, the exemplary implementation of a 3D collision avoidance volume and/or its 3D collision avoidance volume representation described below include integrated modification properties that are controllable by a user in the user interface and are activated by user selection of a face of the 3D collision avoidance volume representation without the explicit activation of a separate modification control element mode or tool. Such a configuration allows a more simplified and intuitive user interface that is more easily learned and operated, particularly by relatively unskilled users. In various implementations, a user may operate various graphical modification properties in the 3D view using an input device in order to modify the 3D collision avoidance volume.

A user interface 1505 shown in FIGS. 15-19 is similar to the user interface 305. It will be appreciated that certain numbered elements 15XX of the user interface 1505 may correspond to and/or be provided by similarly numbered elements 3XX described in FIGS. 3-9, and may generally be understood based on the previous description of similar or analogous elements, unless otherwise indicated below.

Figure 15:
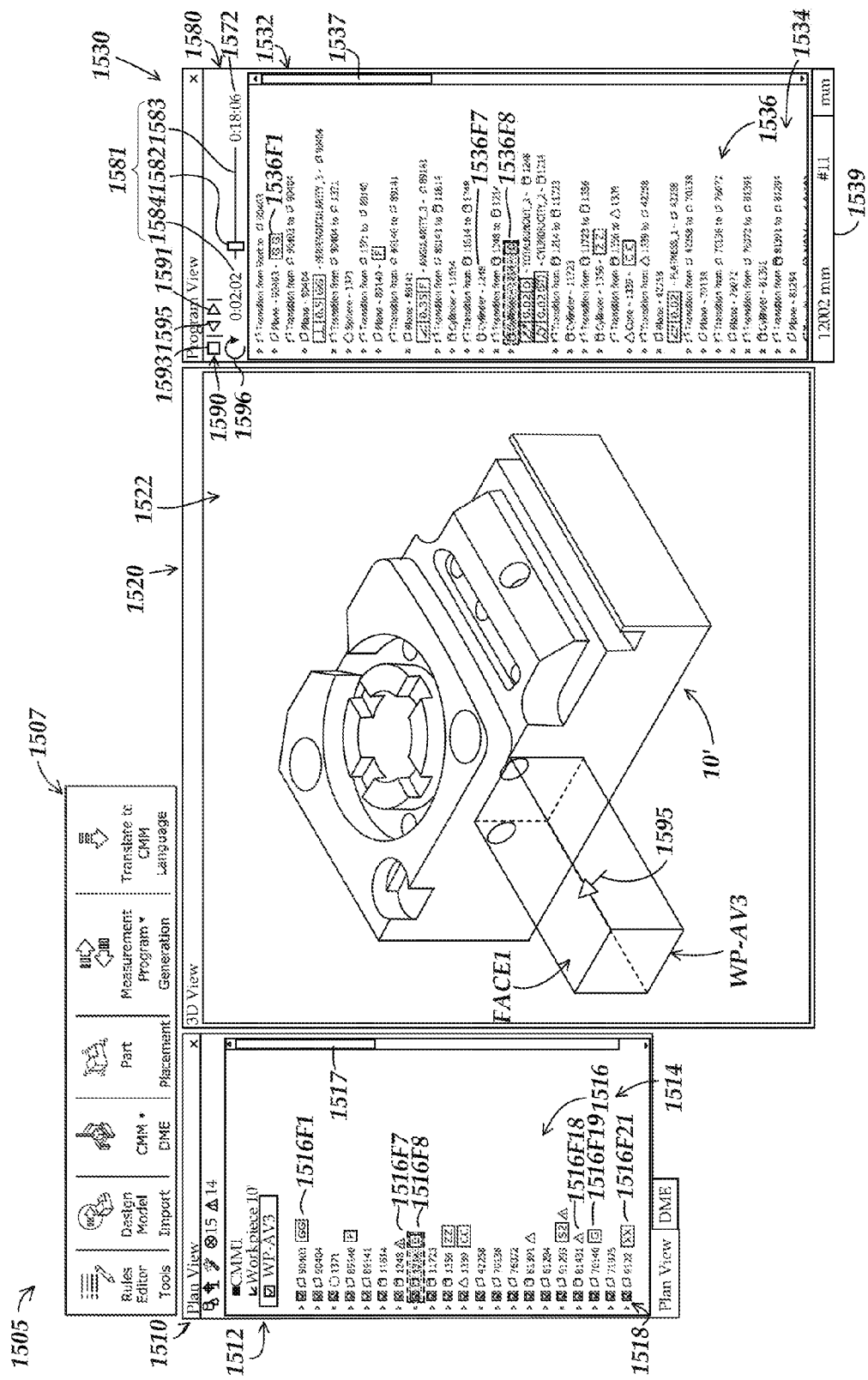
FIG. 15 is a first diagram of a user interface illustrating one user interface feature or operation associated with the graphical modification properties of one implementation of a 3D collision avoidance volume and its representation.

FIG. 15 is a first diagram of a user interface 1505 illustrating one user interface feature or operation associated with integrated graphical modification properties of one implementation of a 3D collision avoidance volume and/or its 3D collision avoidance volume representation WP-AV3.

In the implementation shown in FIG. 15, a system for programming workpiece feature inspection operations for a coordinate measuring machine (e.g. the coordinate measuring machine of FIG. 1) comprises the user interface 1505. The coordinate measuring machine (CMM) includes at least one sensor (e.g. the probe 21 and/or stylus 21T) used for determining workpiece feature measurement data, a stage (e.g. the stage 23) for holding a workpiece 10' wherein at least one of the sensor or the stage are movable relative to one another, and a CMM control portion (e.g. the simulation status and control portion 280). The system comprises a computer aided design (CAD) file processing portion (e.g. the CAD file processing portion 205), the user interface 1505, and an inspection motion path generation portion (e.g. as included in the inspection path/sequence manager 206). The CAD file processing portion inputs a workpiece CAD file corresponding to a workpiece and analyzes the file to automatically determine inspectable workpiece features on the workpiece corresponding to a plurality of geometric feature types. The inspection motion path generation portion automatically generates at least part of an inspection motion path used in an inspection program generated by the system for inspecting the workpiece 10' represented by the input workpiece CAD file.

The user interface 1505 comprises a workpiece inspection program simulation portion 1522. The workpiece inspection program simulation portion is configured to display a 3D view 1520 including at least one of workpiece features on the workpiece 10' or inspection operation representations corresponding to inspection operations to be performed on workpiece features according to a current workpiece feature inspection plan. The user interface 1505 further comprises one or more auxiliary collision avoidance volume creation elements (not shown), as previously described with reference to FIGS. 4-6. The one or more auxiliary collision avoidance volume creation elements are operable to perform operations that at least one of create or define an auxiliary collision avoidance volume that is displayed as a 3D collision avoidance volume representation WP-AV3 in the 3D view.

In the operating state shown in FIG. 15, the auxiliary collision avoidance volume that is displayed as a 3D collision avoidance volume representation WP-AV3 has been created according to operations similar or analogous to those previously described in FIGS. 4-6. The user interface 1505 additionally comprises a cursor 1595 that may be used to interact with the 3D collision avoidance volume representation WP-AV3 (e.g. to select a face) as described further with respect to FIG. 16. The cursor is positioned to select the face FACE1 in the FIG. 15.

Figure 16:
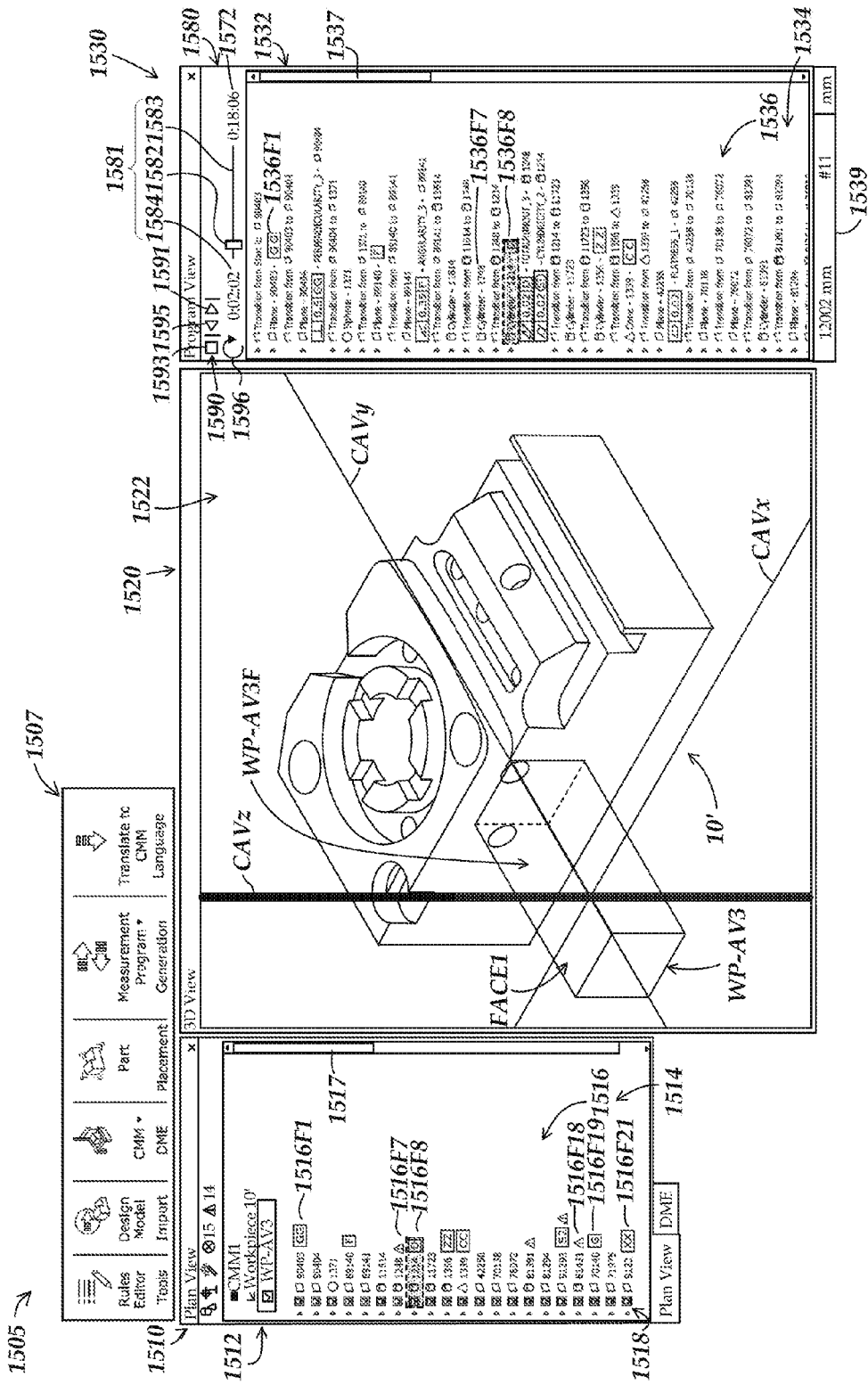
FIG. 16 is a second diagram of the user interface of FIG. 15 illustrating an additional user interface feature or operation associated with the graphical modification properties of the 3D collision avoidance volume and its representation.

FIG. 16 is a second diagram of the user interface 1505 of FIG. 15 illustrating an additional user interface feature or operation associated with integrated graphical modification properties of the 3D collision avoidance volume and its representation. As shown in FIG. 16, the 3D collision avoidance volume representation WP-AV3 has graphical modification properties which are controllable by a user in the user interface 1505. In the operating state shown in FIG. 16, and the modification properties have been activated by user selection of the face FACE1 (e.g. by clicking or depressing the left button of a mouse that is used as an input device, with the cursor 1595 positioned on FACE1 as shown in FIG. 15) without the explicit activation of a separate modification control element mode or modification control tool. In the particular implementation shown in FIG. 16, the cursor 1595 has disappeared as a result of the selection and the activation of the graphical modification properties is indicated by the appearance or representation of the axes CAVx, CAVy and CAVz in the user interface.

In some implementations, the graphical modification properties may include at least one of size modification, rotation, or position translation of an auxiliary collision avoidance volume. An axis representation may be configured to indicate at least one of a direction of size modification, a rotation axis, or a direction of a position translation. In various implementations, an orientation of the axis representation is based on a normal direction of the selected face (e.g. the selected face FACE1 shown in FIG. 16) of the 3D collision avoidance volume representation. In various implementations, the at least one of a direction of size modification, a rotation axis, or a direction of a position translation may be based on the normal direction of the selected face of the 3D collision avoidance volume representation.

As shown in FIG. 16, when a user selects the face WP-AV3F with the cursor 1595, the user interface 1505 is configured to display an axis representation comprising collision avoidance volume axes CAVx, CAVy and CAVz which correspond to the 3D collision avoidance volume representation WP-AV3. The axis representation is configured such that its orientation indicates at least one of a direction of size modification, a rotation axis, or a direction of a position translation of the 3D collision avoidance volume representation WP-AV3F as will be shown in greater detail with respect to FIGS. 17-19. In the implementation shown in FIG. 16, the axis CAVz is shown with a thicker line to highlight it and indicate that it is a normal direction to the selected face WP-AV3F, and provides a reference for potential modifications. It will be appreciated that if a user selects a different a face, the axis representation may be shown with a different orientation and/or highlighting of the collision avoidance volume axes to correspond to that particular face.

The defined auxiliary collision avoidance volume resulting from the operation of the auxiliary collision avoidance volume creation elements and subsequent modifications is operable within the context of the user interface 1505 of the system for programming workpiece feature inspection operations, and is not operable to modify the physical features of the workpiece represented in the input workpiece CAD file.

The inspection motion path generation portion automatically generates an inspection motion path configured to avoid the auxiliary collision avoidance volume such that moving parts of the CMM do not enter the auxiliary collision avoidance volume during the execution of the inspection program generated by the system for inspecting the workpiece represented by the input workpiece CAD file.

Figure 17:
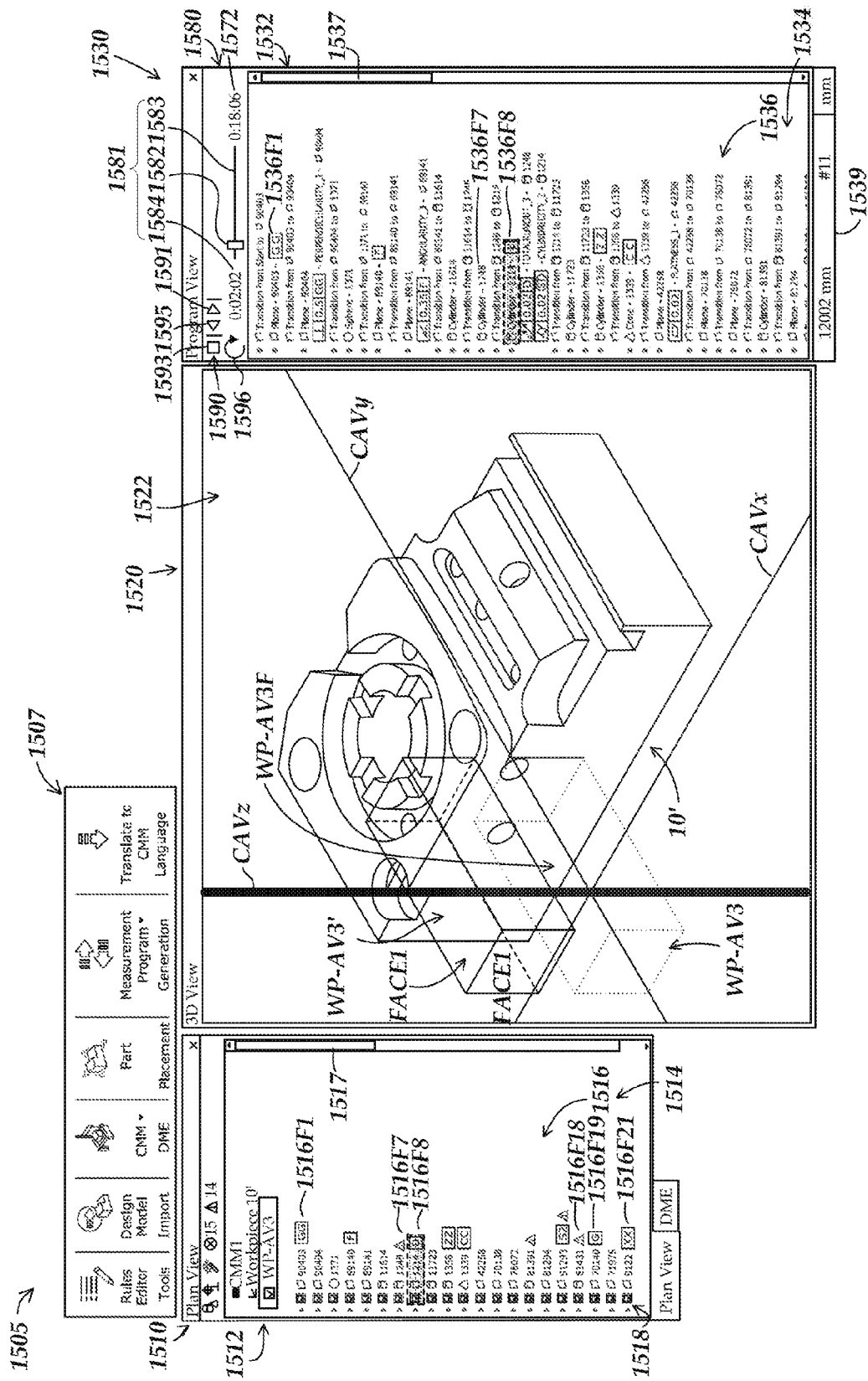
FIG. 17 is a third diagram of the user interface of FIG. 15 illustrating an additional user interface feature or operation associated with the graphical modification properties of the 3D collision avoidance volume and its representation.

FIG. 17 is a third diagram of the user interface 1505 of FIG. 15 illustrating an additional user interface feature or operation associated with integrated graphical modification properties of the 3D collision avoidance volume and its representation. In the operating state shown in FIG. 17, after selection of the face FACE1 as previously described with reference to FIG. 16 (e.g. by clicking or depressing the left button of a mouse), the user has performed a predefined operation using the input device which drags or translates the entire 3D collision avoidance volume representation WP-AV3 along the normal direction to the selected face FACE1. In one implementation, the associated predefined operation comprises holding the left mouse button depressed while moving the mouse approximately along a direction corresponding to the normal direction. In this way, the user may translate a position of the auxiliary collision avoidance volume that is displayed in real time as a modified 3D collision avoidance volume representation WP-AV3' in the 3D view, while the original 3D collision avoidance volume representation WP-AV3 is displayed in a dotted line type. It will be appreciated that in this implementation, by selecting the face WP-AV3F, the auxiliary collision avoidance volume is constrained to be translated along the collision avoidance volume axis CAVz. It will be appreciated that if a user selects a different a face, the axis representation may be shown with a different orientation and/or highlighting of the collision avoidance volume axes, and the operations outlined above will operate with reference to a normal direction or vector corresponding to that particular face.

Figure 18:
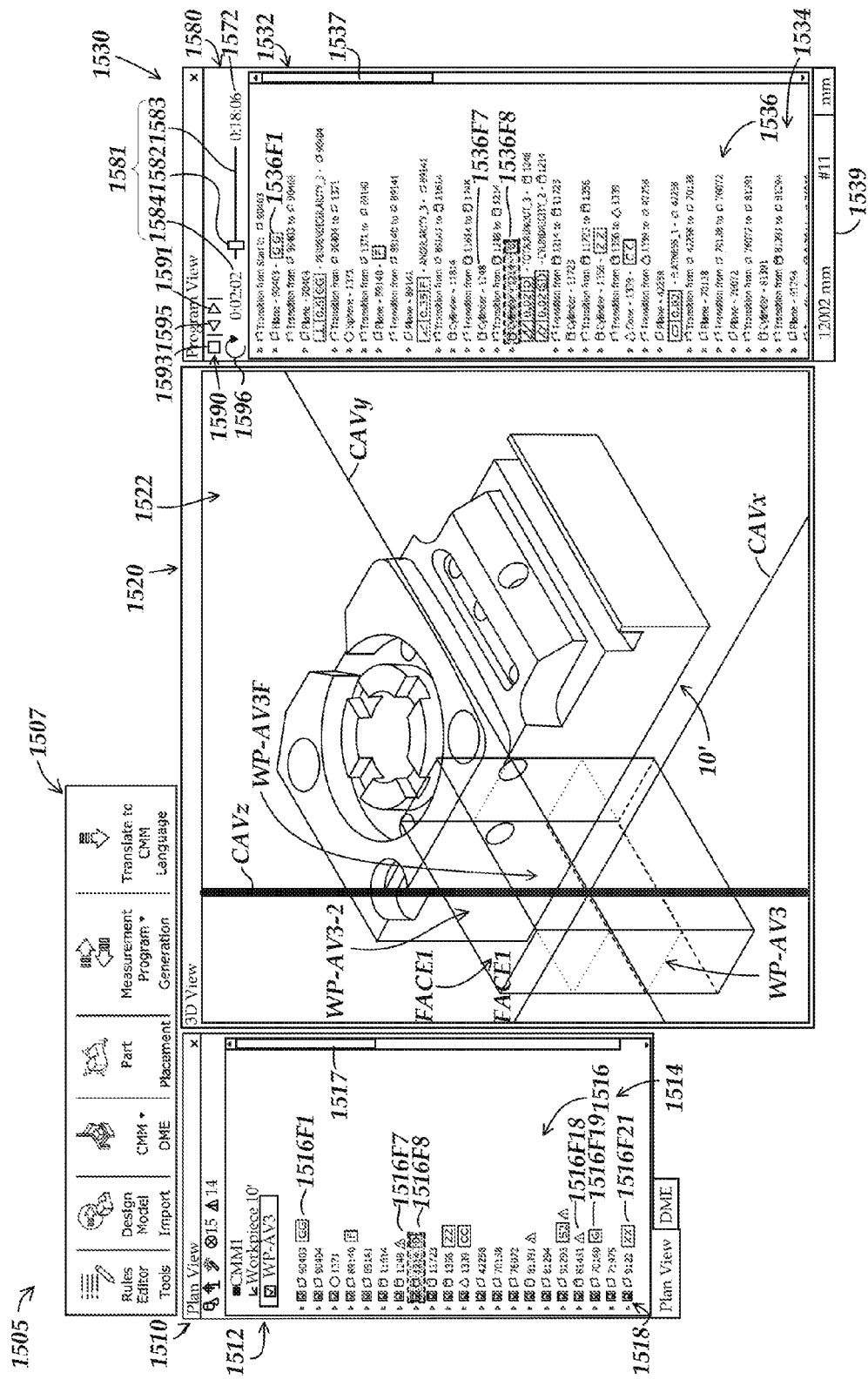
FIG. 18 is a fourth diagram of the user interface of FIG. 15 illustrating an additional user interface feature or operation associated with the graphical modification properties of the 3D collision avoidance volume and its representation.

FIG. 18 is a fourth diagram of the user interface 1505 of FIG. 15 illustrating an additional user interface feature or operation associated with integrated graphical modification properties of the 3D collision avoidance volume and its representation. In the operating state shown in FIG. 18, after selection of the face FACE1 as previously described with reference to FIG. 16 (e.g. by clicking or depressing the left button of a mouse), the user has performed a predefined operation using the input device which expands or changes the size of the 3D collision avoidance volume representation WP-AV3 along the normal direction to the selected face FACE1. In one implementation, the associated predefined operation comprises holding both the left and right mouse buttons depressed while moving the mouse approximately along a direction corresponding to the normal direction. In this way, the user may expand or contract the size of the auxiliary collision avoidance volume (e.g. about its center). The size may be displayed in real time as a modified 3D collision avoidance volume representation WP-AV3-2 in the 3D view, while the original 3D collision avoidance volume representation WP-AV3 may be displayed in a dotted line type. It will be appreciated that in this implementation, by selecting the face FACE1, the auxiliary collision avoidance volume is constrained to be expanded or contracted along the collision avoidance volume axis CAVz. It will be appreciated that if a user selects a different a face, the axis representation may be shown with a different orientation and/or highlighting of the collision avoidance volume axes, and the operations outlined above will operate with reference to a normal direction or vector corresponding to that particular face.

Figure 19:
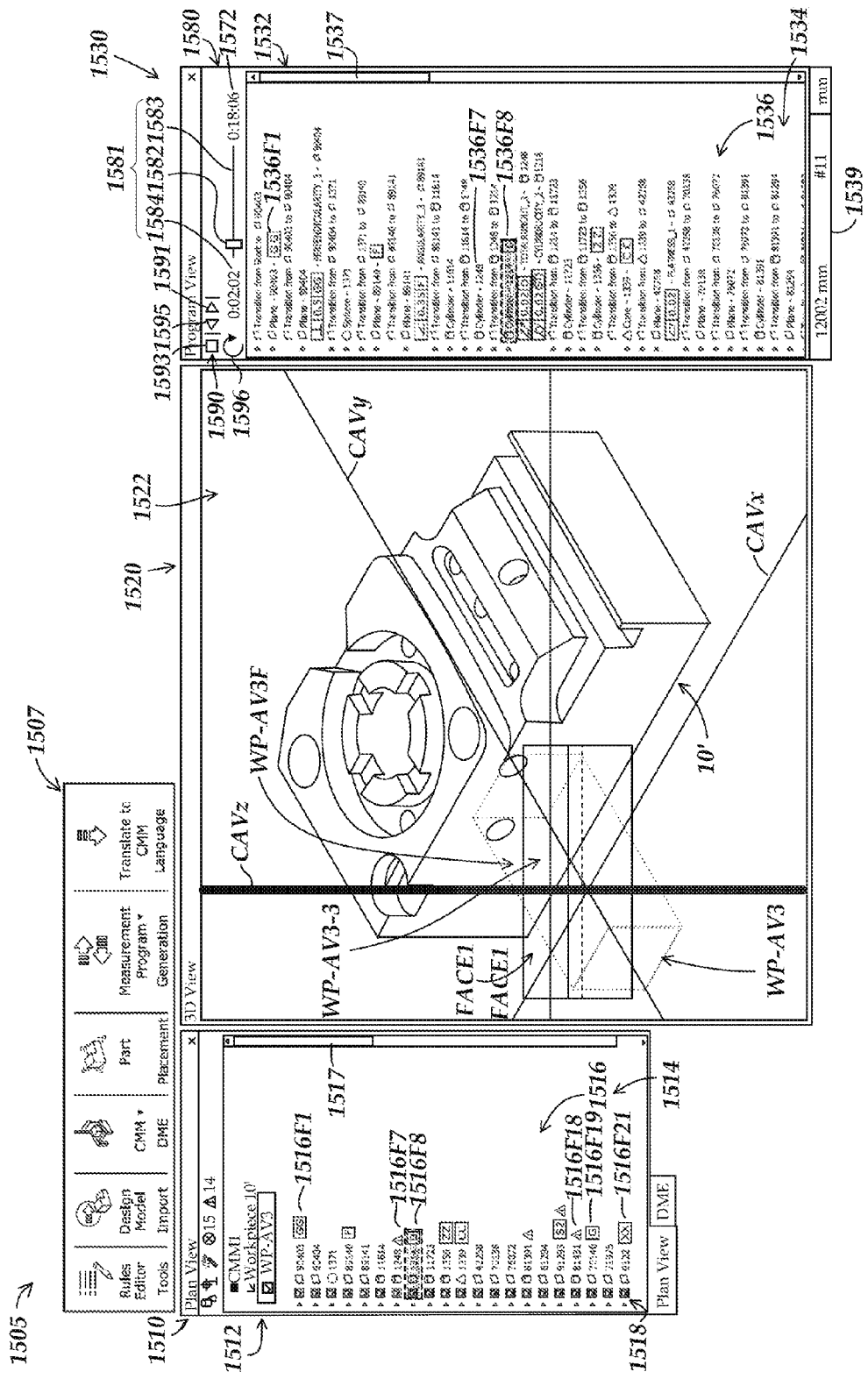
FIG. 19 is a fifth diagram of the user interface of FIG. 15 illustrating an additional user interface feature or operation associated with the graphical modification properties of the 3D collision avoidance volume and its representation.

FIG. 19 is a fifth diagram of the user interface 1505 of FIG. 15 illustrating an additional user interface feature or operation associated with integrated graphical modification properties of the 3D collision avoidance volume and its representation. In the operating state shown in FIG. 19, after selection of the face FACE1 as previously described with reference to FIG. 16 (e.g. by clicking or depressing the left button of a mouse), the user has performed a predefined operation using the input device which rotates the 3D collision avoidance volume representation WP-AV3 about the normal direction to the selected face FACE1. In one implementation, the associated predefined operation comprises holding the right mouse button depressed while moving the mouse approximately along a direction corresponding to the normal direction (e.g. along a first direction to rotate in a first sense, and along the opposite direction to rotate in the opposite sense.) In this way, the user may rotate the auxiliary collision avoidance volume (e.g. about its center). The rotated volume may be displayed in real time as a modified 3D collision avoidance volume representation WP-AV3-3 in the 3D view, while the original 3D collision avoidance volume representation WP-AV3 may be displayed in a dotted line type. It will be appreciated that in this implementation, by selecting the face FACE1, the auxiliary collision avoidance volume is constrained to rotate about the collision avoidance volume axis CAVz. It will be appreciated that if a user selects a different a face, the axis representation may be shown with a different orientation and/or highlighting of the collision avoidance volume axes, and the operations outlined above will operate with reference to a normal direction or vector corresponding to that particular face.

Figure 20:
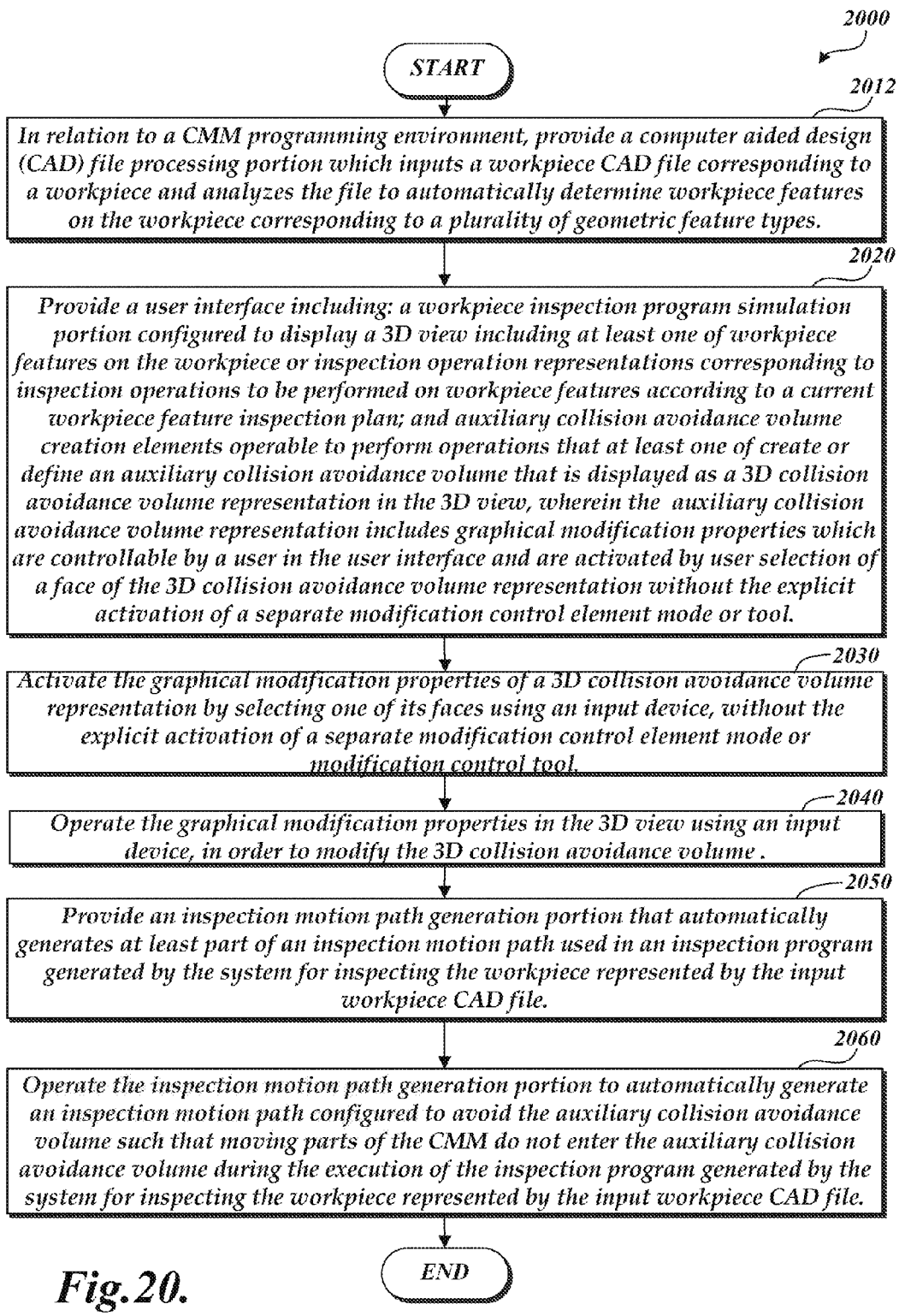
FIG. 20 is a flow diagram illustrating one exemplary implementation of a method or routine for editing or modifying an auxiliary collision avoidance volume according to principles disclosed herein.

FIG. 20 is a flow diagram illustrating one exemplary implementation of a method or routine 2000 for editing or modifying an auxiliary collision avoidance volume having integrated modification properties according to principles disclosed herein.

At a block 2012, in relation to a CMM programming environment, a computer aided design (CAD) file processing portion is provided which inputs a workpiece CAD file corresponding to a workpiece and analyzes the file to automatically determine workpiece features on the workpiece corresponding to a plurality of geometric feature types. At a block 2020, a user interface is provided including a workpiece inspection program simulation portion configured to display a 3D view including at least one of workpiece features on the workpiece or inspection operation representations corresponding to inspection operations to be performed on workpiece features according to a current workpiece feature inspection plan. The user interface further comprises auxiliary collision avoidance volume creation elements operable to perform operations that at least one of create or define an auxiliary collision avoidance volume that is displayed as a 3D collision avoidance volume representation in the 3D view. The auxiliary collision avoidance volume representation includes graphical modification properties which are controllable by a user in the user interface. According to principles disclosed herein, the graphical modification properties are activated by user selection of a face of the 3D collision avoidance volume representation without the explicit activation of a separate modification control element mode or tool. In various implementations, the auxiliary collision avoidance volume and/or its representation are operable within the context of the user interface of the system for programming workpiece feature inspection operations, and is not operable to modify the physical features of the workpiece represented in the input workpiece CAD file.

At a block 2030, a user activates the graphical modification properties of a 3D collision avoidance volume representation by selecting one of its faces using an input device, without the explicit activation of a separate modification control element mode or modification control tool. At a block 2040, a user operates the graphical modification properties in the 3D view using an input device, in order to modify the 3D collision avoidance volume.

At a block 2050, an inspection motion path generation portion is provided in association with the CMM programming environment. The inspection motion path generation portion is configured to automatically generate at least part of an inspection motion path used in an inspection program generated by the system for inspecting the workpiece represented by the input workpiece CAD file.

At a block 2060, the inspection motion path generation portion is operated to automatically generate the inspection motion path. In various implementations, the inspection motion path is configured to avoid an auxiliary collision avoidance volume such that moving parts of the CMM do not enter the auxiliary collision avoidance volume during the execution of the inspection program generated by the system for inspecting the workpiece represented by the input workpiece CAD file.

In some implementations, the graphical modification properties may include at least one of size modification, rotation, or position translation of an auxiliary collision avoidance volume. In some implementations, the routine 2000 may further comprise displaying an axis representation indicating at least one of a direction of size modification, a rotation axis, or a direction of a position translation. In some implementations, an orientation of the axis representation may be determined to align one of its axes with a normal direction of the selected face of the 3D collision avoidance volume representation. In some implementations, the at least one of a direction of size modification, a rotation axis, or a direction of a position translation may be based on and/or constrained by the normal direction of the selected face of the 3D collision avoidance volume representation. In some implementations, the axis representation may be configured to indicate which axis is aligned in the normal direction of the selected face of the 3D collision avoidance volume representation.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. For example, although auxiliary collision avoidance volumes having orthogonal sides have generally been illustrated herein, other volume shapes (e.g. cylindrical) may be provided using suitable menus or the like in the user interface. Furthermore, the user interface may be configured such that modifying an auxiliary collision avoidance volume in the 3D view causes any associated numerical dimensions displayed in a properties view or the like to be automatically updated (e.g. in the Properties View window), according to previously disclosed principles. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

The disclosure of U.S. provisional patent application Ser. No. 62/156,730, filed May 4, 2015, is incorporated herein in its entirety.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A system for programming workpiece feature inspection operations for a coordinate measuring machine, the coordinate measuring machine (CMM) including at least one sensor used for determining workpiece feature measurement data, a stage for holding a workpiece wherein at least one of the sensor or the stage are movable relative to one another, and a CMM control portion, the system comprising:
a computer aided design (CAD) file processing portion which inputs a workpiece CAD file corresponding to a workpiece and analyzes the file to automatically determine inspectable workpiece features on the workpiece corresponding to a plurality of geometric feature types;
a user interface comprising:
a workpiece inspection program simulation portion configured to display a 3D view including at least one of workpiece features on the workpiece or inspection operation representations corresponding to inspection operations to be performed on workpiece features according to a current workpiece feature inspection plan; and
one or more auxiliary collision avoidance volume creation elements operable to perform operations that at least one of create or define an auxiliary collision avoidance volume that is displayed as a 3D collision avoidance volume representation in the 3D view; and
an inspection motion path generation portion that automatically generates at least part of an inspection motion path used in an inspection program generated by the system for inspecting the workpiece represented by the input workpiece CAD file, wherein:
the 3D collision avoidance volume representation has graphical modification properties which are controllable by a user in the user interface, and the modification properties are activated by user selection of a face of the 3D collision avoidance volume representation without explicit activation of a separate modification control element mode or modification control tool;
the defined auxiliary collision avoidance volume resulting from the operation of the auxiliary collision avoidance volume creation elements and subsequent modifications is operable within the context of the user interface of the system for programming workpiece feature inspection operations, and is not operable to modify physical features of the workpiece represented in the input workpiece CAD file; and
the inspection motion path generation portion automatically generates an inspection motion path configured to avoid the auxiliary collision avoidance volume such that moving parts of the CMM do not enter the auxiliary collision avoidance volume during execution of the inspection program generated by the system for inspecting the workpiece represented by the input workpiece CAD file.

2. The system of claim 1, wherein the graphical modification properties include at least one of size modification, rotation, or position translation of an auxiliary collision avoidance volume.

3. The system of claim 2, wherein the graphical modification properties comprise an axis representation which is configured to indicate at least one of a direction of size modification, a rotation axis, or a direction of a position translation.

4. The system of claim 3, wherein an orientation of the axis representation is based on a normal direction of the selected face of the 3D collision avoidance volume representation.

5. The system of claim 3, wherein the at least one of a direction of size modification, a rotation axis, or a direction of a position translation is based on the normal direction of the selected face of the 3D collision avoidance volume representation.

6. The system of claim 3, wherein the axis representation is configured to indicate a normal direction of the selected face of the 3D collision avoidance volume representation.

7. A method for programming workpiece feature inspection operations for a coordinate measuring machine (CMM), the method comprising:
provide a computer aided design (CAD) file processing portion which inputs a workpiece CAD file corresponding to a workpiece and analyzes the file to automatically determine workpiece features on the workpiece corresponding to a plurality of geometric feature types;
providing a user interface comprising:
a workpiece inspection program simulation portion configured to display a 3D view including at least one of workpiece features on the workpiece or inspection operation representations corresponding to inspection operations to be performed on workpiece features according to a current workpiece feature inspection plan; and
one or more auxiliary collision avoidance volume creation elements operable to perform operations that at least one of create or define an auxiliary collision avoidance volume, wherein an auxiliary collision avoidance volume as at least one of created or defined is displayable as a 3D collision avoidance volume representation in the 3D view which includes graphical modification properties which are controllable in the user interface;
activating the graphical modification properties by selecting a face of the 3D collision avoidance volume representation without explicit activation of a separate modification control element mode or modification control tool;
modifying properties of the auxiliary collision avoidance volume in the 3D view;
providing an inspection motion path generation portion that automatically generates at least part of an inspection motion path used in an inspection program generated by a system for inspecting the workpiece represented by the input workpiece CAD file; and
operating the inspection motion path generation portion to automatically generate the inspection motion path configured to avoid an auxiliary collision avoidance volume such that moving parts of the CMM do not enter the auxiliary collision avoidance volume during execution of the inspection program generated by the system for inspecting the workpiece represented by the input workpiece CAD file.

8. The method of claim 7, wherein the graphical modification properties include at least one of size modification, rotation, or position translation of an auxiliary collision avoidance volume.

9. The method of claim 8, further comprising displaying an axis representation indicating at least one of a direction of size modification, a rotation axis, or a direction of a position translation.

10. The method of claim 9, wherein an orientation of the axis representation is based on a normal direction of the selected face of the 3D collision avoidance volume representation.

11. The method of claim 8, wherein the at least one of a direction of size modification, a rotation axis, or a direction of a position translation is based on the normal direction of the selected face of the 3D collision avoidance volume representation.

12. The method of claim 9, wherein the axis representation is configured to indicate the normal direction of the selected face of the 3D collision avoidance volume representation.

* * * * *